US011221079B2

(12) United States Patent
Xu et al.

(10) Patent No.: US 11,221,079 B2
(45) Date of Patent: Jan. 11, 2022

(54) CRYOCOOLER AND ROTARY VALVE UNIT FOR CRYOCOOLER

(71) Applicant: SUMITOMO HEAVY INDUSTRIES, LTD., Tokyo (JP)

(72) Inventors: Mingyao Xu, Nishitokyo (JP); Takaaki Morie, Yokosuka (JP); Qian Bao, Nishitokyo (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 216 days.

(21) Appl. No.: 16/568,238

(22) Filed: Sep. 11, 2019

(65) Prior Publication Data

US 2020/0003465 A1    Jan. 2, 2020

Related U.S. Application Data

(63) Continuation of application No. PCT/JP2018/004999, filed on Feb. 14, 2018.

(30) Foreign Application Priority Data

Mar. 13, 2017   (JP) .............................. JP2017-047748

(51) Int. Cl.
| F16K 11/074 | (2006.01) |
| F16K 3/02 | (2006.01) |
| F16K 31/04 | (2006.01) |

(52) U.S. Cl.
CPC .............. *F16K 11/074* (2013.01); *F16K 3/02* (2013.01); *F16K 31/041* (2013.01); *F25B 2600/2521* (2013.01)

(58) Field of Classification Search
None
See application file for complete search history.

(56) References Cited

U.S. PATENT DOCUMENTS

| 5,361,588 | A | 11/1994 | Asami et al. |
| 7,631,505 | B2 | 12/2009 | Seitz et al. |
| 7,775,239 | B2* | 8/2010 | Jeong .................... F16K 11/074 137/625.21 |
| 9,657,970 | B2 | 5/2017 | Morie et al. |

(Continued)

FOREIGN PATENT DOCUMENTS

| CN | 103925394 A | 7/2014 |
| JP | 2617681 B2 | 6/1997 |

(Continued)

*Primary Examiner* — Daphne M Barry
(74) *Attorney, Agent, or Firm* — HEA Law PLLC

(57) ABSTRACT

A cryocooler includes a displacer capable of reciprocating in an axial direction, a cylinder that accommodates the displacer, a drive piston that drives the displacer in the axial direction, a drive chamber that accommodates the drive piston, a rotary valve that includes a first valve element that is one of a valve rotor rotatable around a rotary valve rotation axis and a valve stator, and a second valve element that is the other of the valve rotor and the valve stator, a reversible motor that is coupled with the rotary valve so as to rotate the rotary valve around the rotary valve rotation axis. The rotary valve includes a coupling mechanism that couples the first component and the second component with each other. The first relative angle is designed to cool the cryocooler, and the second relative angle is designed to heat the cryocooler.

6 Claims, 11 Drawing Sheets

(56) References Cited

U.S. PATENT DOCUMENTS

| | | | |
|---|---|---|---|
| 9,829,218 B2 | 11/2017 | Xu | |
| 2005/0115247 A1* | 6/2005 | Gao | F25B 9/145 62/6 |
| 2013/0025297 A1 | 1/2013 | Matsubara et al. | |
| 2013/0074523 A1* | 3/2013 | Xu | F25B 9/14 62/6 |
| 2014/0208774 A1* | 7/2014 | Morie | F25B 9/14 62/6 |

FOREIGN PATENT DOCUMENTS

| | | |
|---|---|---|
| JP | 2007-527985 A | 10/2007 |
| JP | 2013-83428 A | 5/2013 |
| JP | 2014-224656 A | 12/2014 |
| WO | 2011/132563 A1 | 10/2011 |

\* cited by examiner

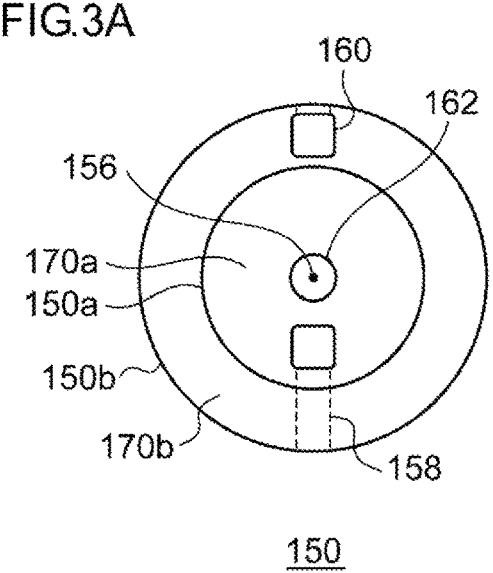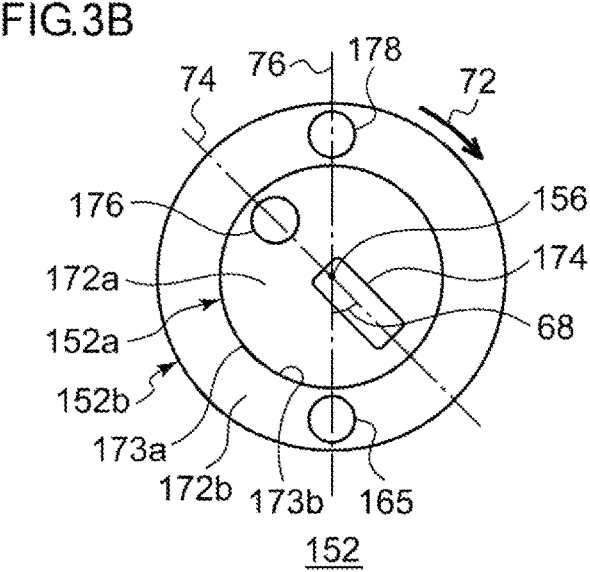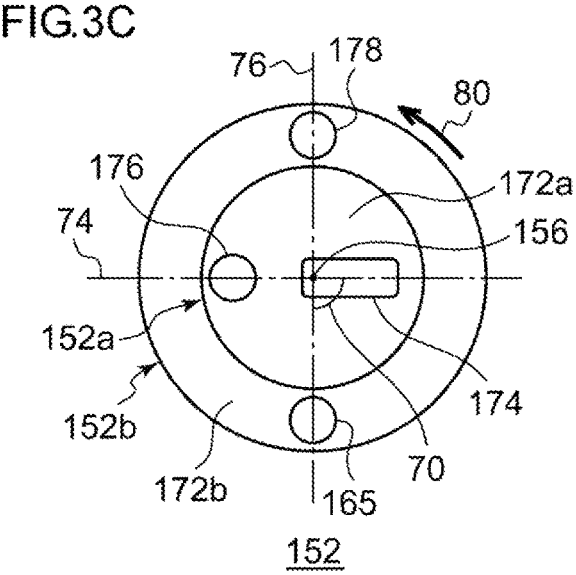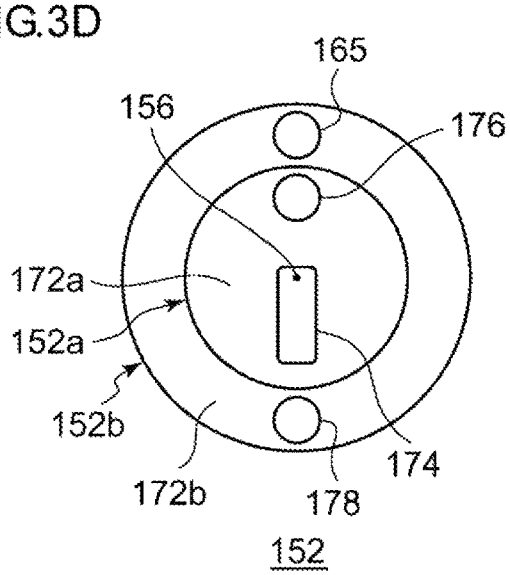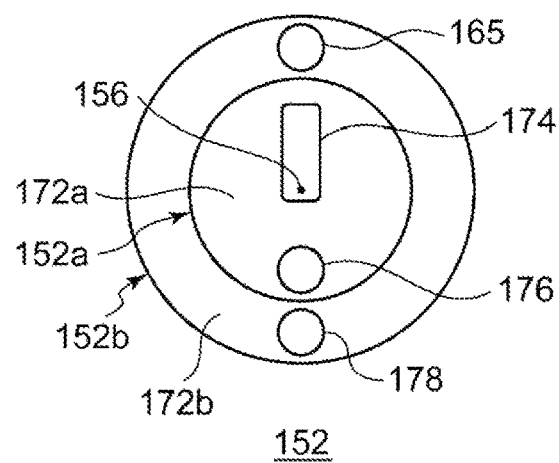

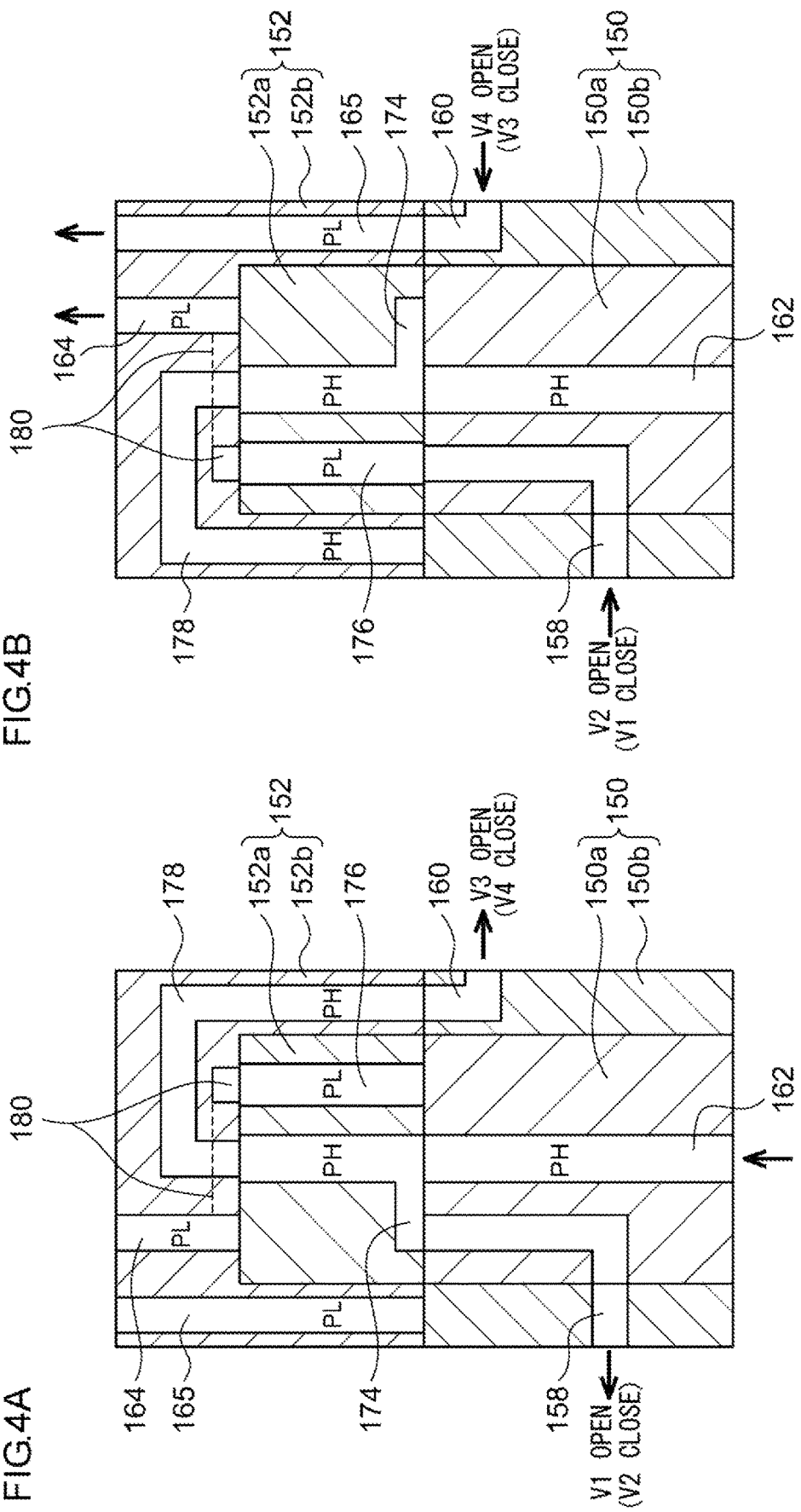

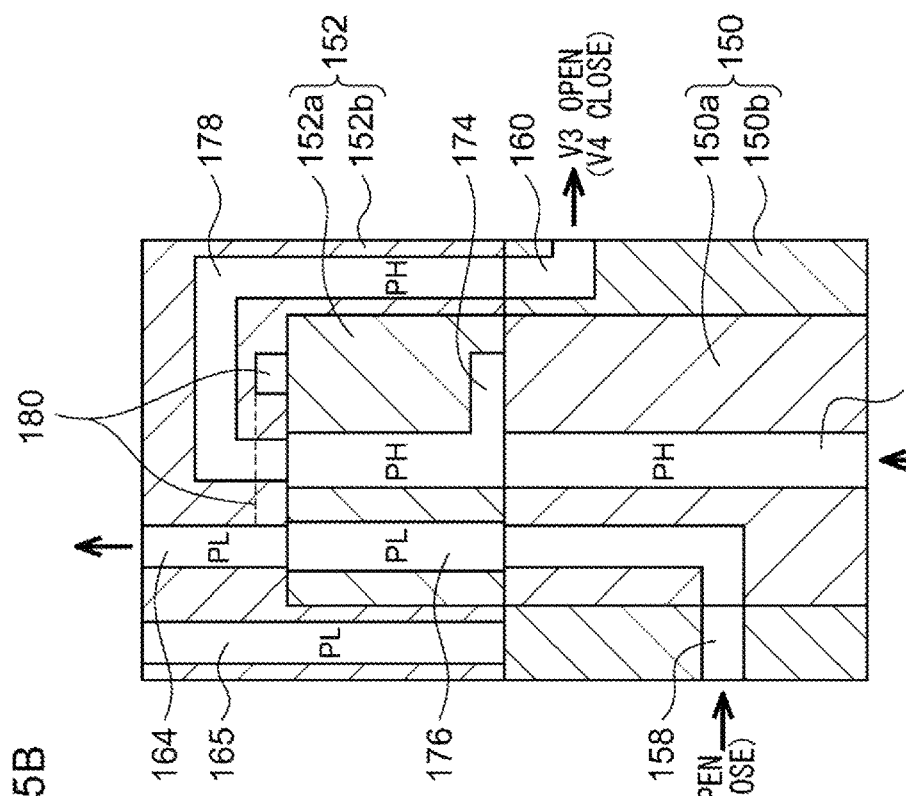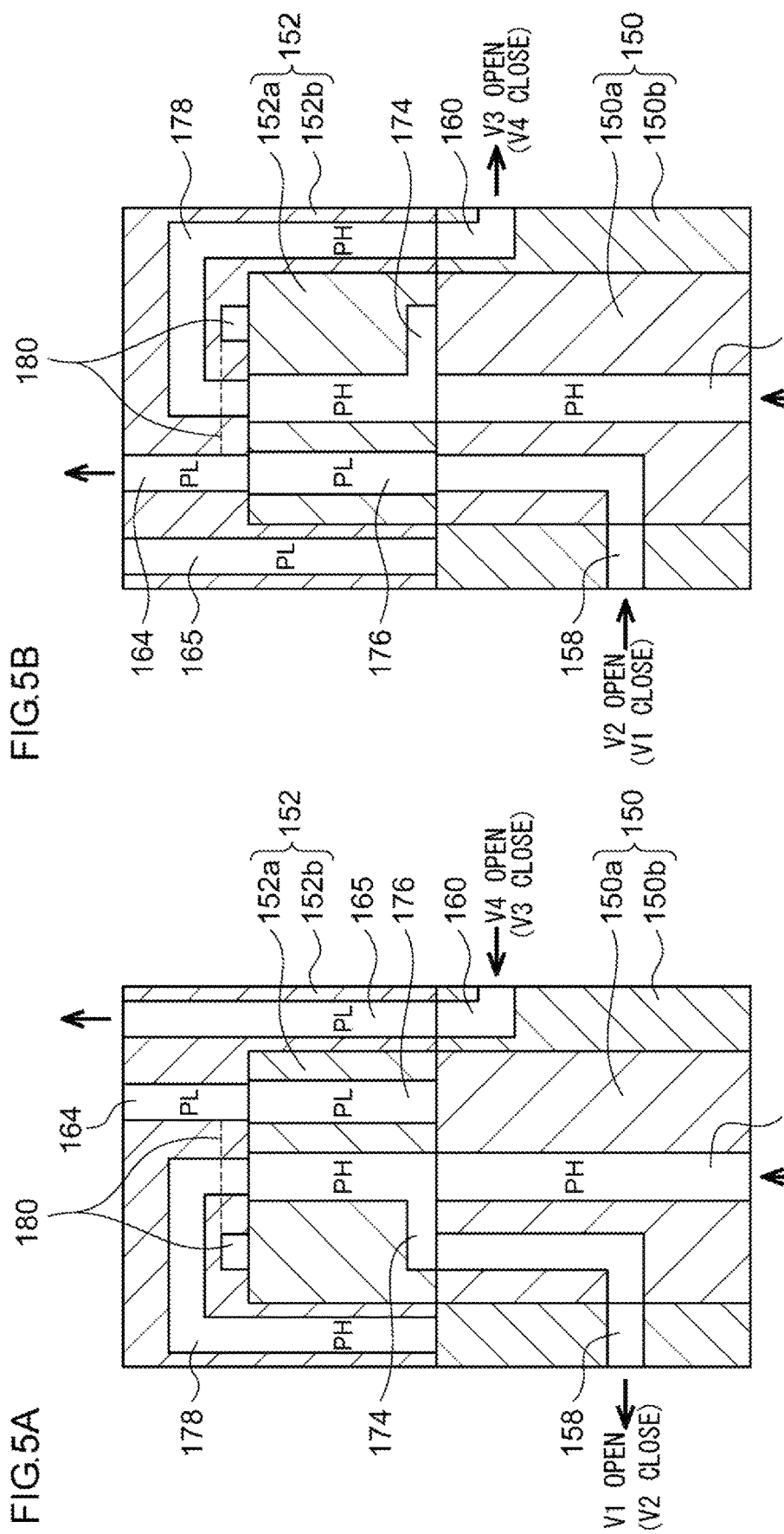

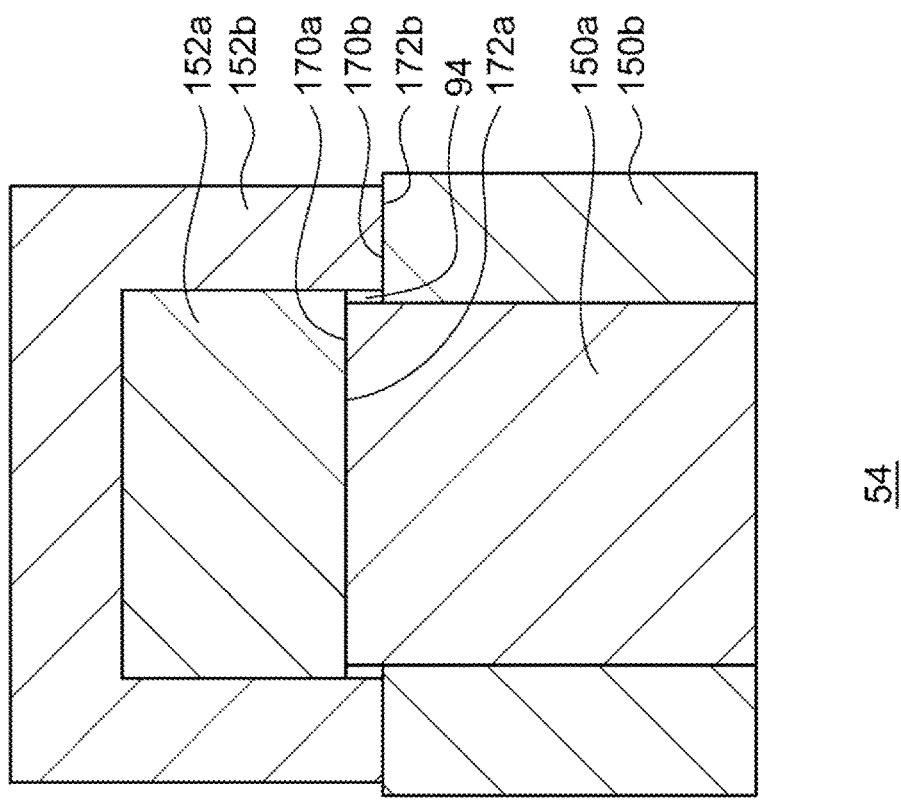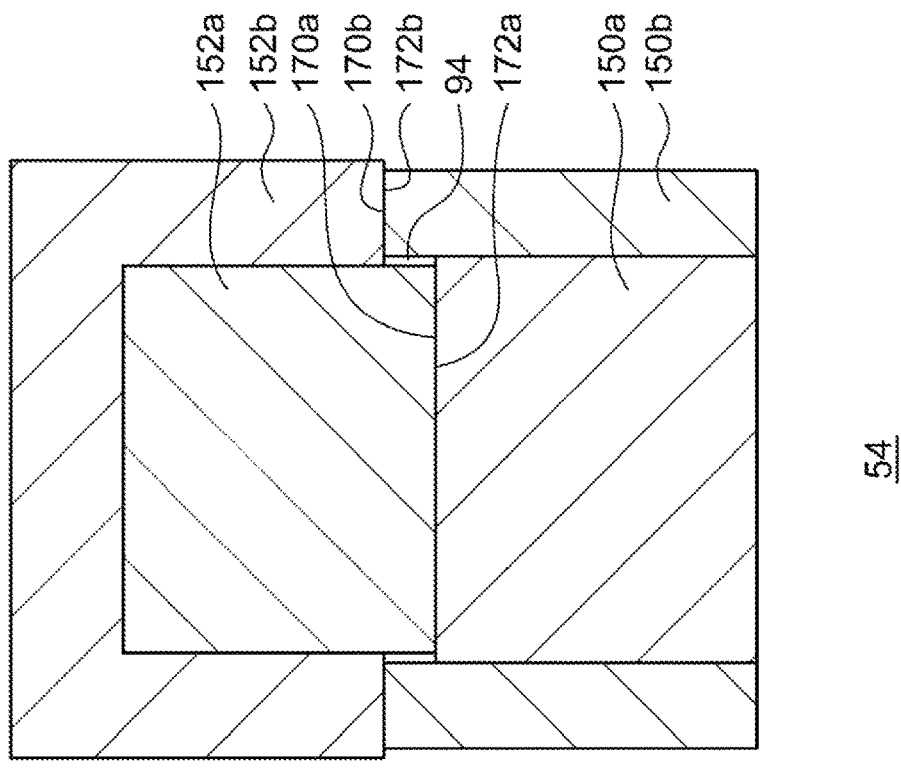

CRYOCOOLER AND ROTARY VALVE UNIT FOR CRYOCOOLER

RELATED APPLICATIONS

The content of Japanese Patent Application No. 2017-047748, and of International Patent Application No. PCT/JP2018/004999, on the basis of which priority benefits are claimed in an accompanying application data sheet, is in its entirety incorporated herein by reference.

BACKGROUND

Technical Field

Certain embodiments of the present invention relate to a cryocooler and a rotary valve unit for a cryocooler.

Description of Related Art

A Gifford McMahon (Gifford-McMahon, GM) cryocooler serving as a representative cryocooler is mainly divided into two types such as a gas-driven type and a motor-driven type, depending on a drive source of a displacer. A typical gas-driven type GM cryocooler has a rotary valve disposed to control a pressure of a working gas expansion chamber, and a valve drive motor mechanically coupled so as to rotate the rotary valve. The displacer is mechanically disconnected from the motor, and the displacer is driven using a gas pressure. Not only an expansion chamber pressure but also a drive gas pressure is controlled by the rotary valve. The motor rotates the rotary valve. In this manner, a periodic volume change in the working gas expansion chamber and a periodic pressure oscillation in an expansion chamber are properly synchronized with each other, thereby forming a refrigerating cycle. In this way, the gas-driven type GM cryocooler is cryogenically cooled.

On the other hand, in a motor-driven type GM cryocooler, the displacer is mechanically coupled with a displacer drive motor. The displacer is caused to reciprocate in an axial direction by the motor. In this manner, a volume of the working gas expansion chamber is periodically changed. The displacer drive motor is also mechanically coupled with the rotary valve for controlling the pressure of the working gas expansion chamber. The motor rotates the rotary valve, and drives the displacer. In this manner, the periodic volume change in the working gas expansion chamber and the periodic pressure oscillation in the expansion chamber are properly synchronized with each other, thereby forming the refrigerating cycle. In this way, the motor-driven type GM cryocooler is cryogenically cooled.

In the motor-driven type GM cryocooler, a so-called rearward rotation heating technique is known in the related art. When the displacer drive motor is rotated forward, the refrigerating cycle is formed by expansion of a working gas. On the other hand, when the motor is rotated rearward, a heating cycle is formed by compression of the working gas. Rotation directions of the motor are switched therebetween, thereby enabling the GM cryocooler to switch between the refrigerating cycle and the heating cycle. In the heating cycle, the adiabatic compression of the working gas occurs in the expansion chamber. As a result, compression heat is generated. Based on the generated compression heat, the GM cryocooler can be heated. For example, the cooled GM cryocooler can be heated so as to recover a room temperature by using rearward rotation heating.

SUMMARY

According to an aspect of the present invention, there is provided a cryocooler including a displacer capable of reciprocating in an axial direction, a cylinder that accommodates the displacer, a drive piston that drives the displacer in the axial direction, a drive chamber that accommodates the drive piston, a rotary valve that includes a first valve element that is one of a valve rotor rotatable around a rotary valve rotation axis and a valve stator, and a second valve element that is the other of the valve rotor and the valve stator, in which the first valve element includes a first component configured to alternately connect the cylinder to a compressor discharge port and a compressor suction port by being rotated relative to the second valve element, and a second component configured to alternately connect the drive chamber to the compressor discharge port and the compressor suction port by being rotated relative to the second valve element, and a reversible motor that is coupled with the rotary valve so as to rotate the rotary valve around the rotary valve rotation axis. The rotary valve includes a coupling mechanism that couples the first component and the second component with each other so that the first component holds a first relative angle with the second component around the rotary valve rotation axis when the reversible motor is rotated forward, and so that the first component holds a second relative angle with the second component around the rotary valve rotation axis when the reversible motor is rotated rearward. The first relative angle is designed to cool the cryocooler. The second relative angle is designed to heat the cryocooler. The coupling mechanism is configured to switch between the first relative angle and the second relative angle in response to a reverse in a rotation direction of the reversible motor.

According to another aspect of the present invention, there is provided a rotary valve unit for a cryocooler. The rotary valve unit includes a rotary valve that includes a first valve element that is one of a valve rotor rotatable around a rotary valve rotation axis and a valve stator, and a second valve element that is the other of the valve rotor and the valve stator, in which the first valve element includes a first component configured to alternately connect a first gas chamber to a compressor discharge port and a compressor suction port by being rotated relative to the second valve element, and a second component configured to alternately connect a second gas chamber to the compressor discharge port and the compressor suction port by being rotated relative to the second valve element, and a reversible motor that is coupled with the rotary valve so as to rotate the rotary valve around the rotary valve rotation axis. The rotary valve includes a coupling mechanism that couples the first component and the second component with each other so that the first component holds a first relative angle with the second component around the rotary valve rotation axis when the reversible motor is rotated forward, and so that the first component holds a second relative angle with the second component around the rotary valve rotation axis when the reversible motor is rotated rearward. The first relative angle is designed to cool the cryocooler. The second relative angle is designed to heat the cryocooler. The coupling mechanism is configured to switch between the first relative angle and the second relative angle in response to a reverse in a rotation direction of the reversible motor.

BRIEF DESCRIPTION OF THE DRAWINGS

FIGS. 3A to 3E are schematic plan views illustrating a rotational sliding surface of the rotary valve unit according to the embodiment.

FIGS. 4A and 4B are schematic sectional views for describing an internal flow path configuration of a rotary valve.

FIGS. 5A and 5B are schematic sectional views for describing an internal flow path configuration of the rotary valve.

FIGS. 11A and 11B are schematic sectional views illustrating a rotary valve according to still another embodiment.

DETAILED DESCRIPTION

Figure 1:
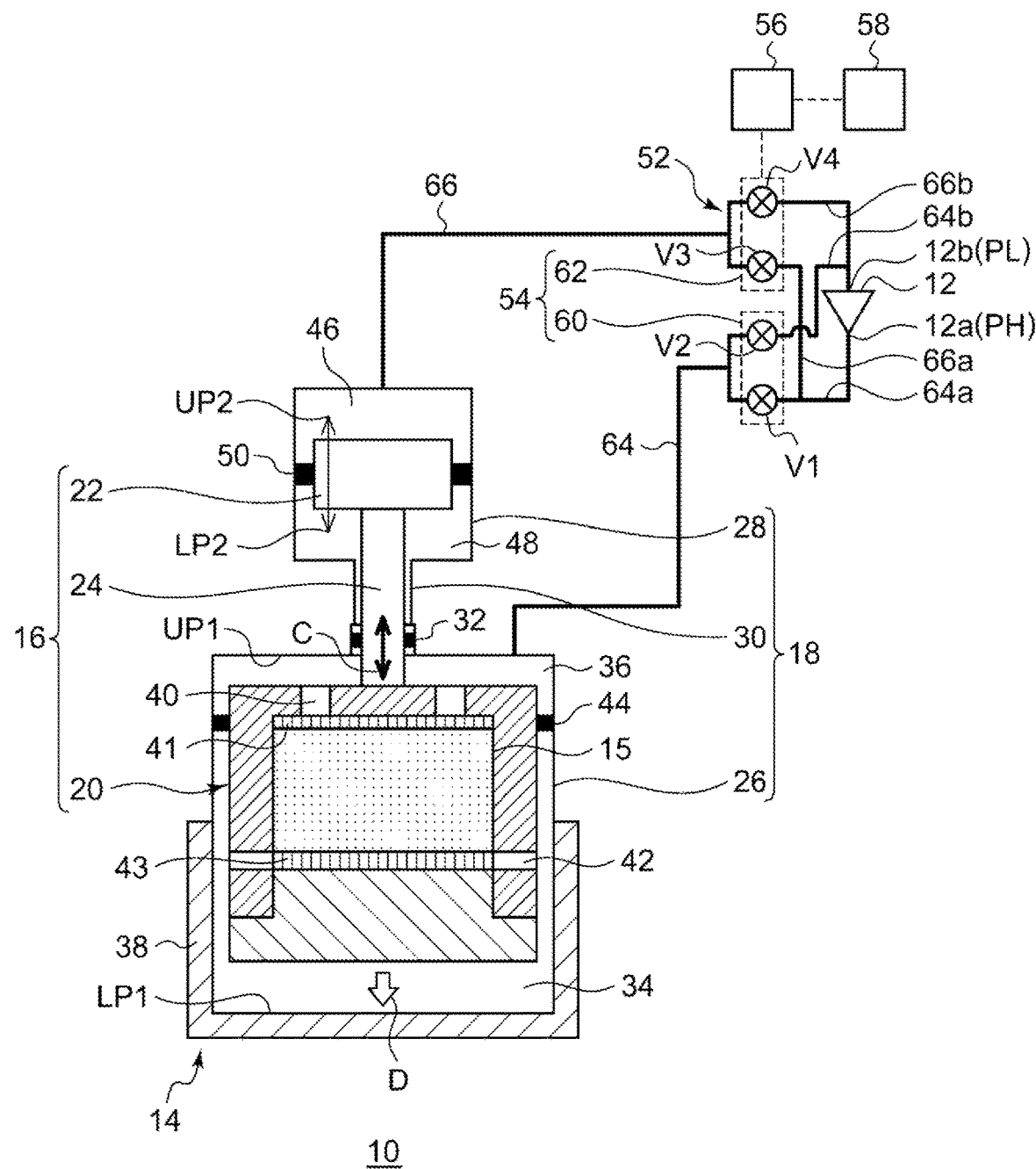
FIG. 1 is a view schematically illustrating a gas-driven type GM cryocooler according to an embodiment.

The present inventors have intensively and repeatedly studied the gas-driven type GM cryocooler. As a result, the following problems have been recognized. For example, even if the rotation direction of the valve drive motor is reversed in the gas-driven type GM cryocooler used in the related art in the same manner as the motor-driven type GM cryocooler, the rearward rotation heating cannot be realized. The reason is as follows. Not only working gas pressure of the expansion chamber but also the drive gas pressure of the displacer is determined by the rotation of the valve drive motor. According to the gas-driven type GM cryocooler used in the related art, the heating cycle is not effectively formed even if the motor is rotated rearward. This results from a fundamental difference between both the motor-driven type and the gas-driven type. According to the motor-driven type, the displacer is mechanically coupled with the motor so as to be forcibly moved by driving the motor. In contrast, according to the gas-driven type, the displacer can be moved only by an operation of the gas pressure. Therefore, there no precedent example in which the rearward rotation heating available in the motor-driven type is applied to the gas-driven type. Without being limited to the gas-driven type GM cryocooler, this problem may arise to other cryocoolers in which the displacer is driven using the gas pressure.

It is desirable to provide a new heating technique for a cryocooler.

An aspect of the present invention may effectively adopt any combination of the above-described configuration elements or those in which configuration elements or expressions according to the present invention are substituted with each other in methods, devices, and systems.

According to the aspect of the present invention, it is possible to provide a new heating technique for a cryocooler.

Hereinafter, embodiments according to the present invention will be described in detail with reference to the drawings. In the description and the drawings, the same reference numerals will be given to the same or equivalent configuration elements, members, and processes, and repeated description thereof will be appropriately omitted. A scale or a shape of each illustrated portion is conveniently set in order to facilitate the description, and is not to be interpreted as being limited unless otherwise specified. The embodiments are merely examples, and do not the scope of the present invention. All characteristics or combinations thereof described in the embodiments are not necessarily essential to the invention.

FIG. 1 is a view schematically illustrating a gas-driven type GM cryocooler according to an embodiment.

A GM cryocooler 10 includes a compressor 12 which compresses working gas (for example, helium gas) and a cold head 14 which cools the working gas through adiabatic expansion. The compressor 12 has a compressor discharge port 12a and a compressor suction port 12b. The cold head 14 is also called an expander.

As will be described in detail later, the compressor 12 supplies high-pressure (PH) working gas from the compressor discharge port 12a to the cold head 14. The cold head 14 includes a regenerator 15 which precools the working gas. The precooled working gas is further cooled through expansion inside the cold head 14. The working gas is collected to the compressor suction port 12b through the regenerator 15. The working gas cools the regenerator 15 when the working gas passes through the regenerator 15. The compressor 12 compresses the recovered low-pressure (PL) working gas, and supplies the working gas to the cold head 14 again.

The illustrated cold head 14 is a single stage type. However, the cold head 14 may be a multi-stage type.

The cold head 14 is a gas-driven type. Accordingly, the cold head 14 includes an axially movable body 16 serving as a free piston driven using gas pressure, and a cold head housing 18 configured to be airtight and accommodating the axially movable body 16. The cold head housing 18 supports the axially movable body 16 so as to be capable of reciprocating in an axial direction. Unlike a motor-driven type GM cryocooler, the cold head 14 does not have a motor for driving the axially movable body 16, and a coupling mechanism (for example, a scotch yoke mechanism).

The axially movable body 16 includes a displacer 20 capable of reciprocating in the axial direction (upward-downward direction in FIG. 1, indicated by an arrow C), and a drive piston 22 coupled with the displacer 20 so as to drive the displacer 20 in the axial direction. The drive piston 22 is located coaxially with and apart from the displacer 20 in the axial direction.

The cold head housing 18 includes a displacer cylinder (simply referred to as a cylinder in some cases) 26 which accommodates the displacer 20, and a piston cylinder 28 which accommodates the drive piston 22. The piston cylinder 28 is located coaxially with and adjacent to the displacer cylinder 26 in the axial direction.

Although details will be described later, a drive part of the cold head 14 which is a gas-driven type is configured to include the drive piston 22 and the piston cylinder 28. In addition, the cold head 14 includes a gas spring mechanism that operates the drive piston 22 so as to relieve or prevent collision or contact between the displacer 20 and the displacer cylinder 26.

In addition, the axially movable body 16 includes a coupling rod 24 that rigidly couples the displacer 20 with the drive piston 22 so that the displacer 20 reciprocates integrally with the drive piston 22 in the axial direction. The coupling rod 24 extends coaxially with the displacer 20 and the drive piston 22 from the displacer 20 to the drive piston 22.

The drive piston 22 has a smaller dimension than that of the displacer 20. An axial length of the drive piston 22 is shorter than that of the displacer 20, and a diameter of the drive piston 22 is smaller than that of the displacer 20. The diameter of the coupling rod 24 is smaller than that of the drive piston 22.

A volume of the piston cylinder 28 is smaller than that of the displacer cylinder 26. The axial length of the piston cylinder 28 is shorter than that of the displacer cylinder 26, and the diameter of the piston cylinder 28 is smaller than that of the displacer cylinder 26.

A dimensional relationship between the drive piston 22 and the displacer 20 is not limited to the above-described relationship, and may be different therefrom. Similarly, the dimensional relationship between the piston cylinder 28 and the displacer cylinder 26 is not limited to the above-described relationship, and may be different therefrom. For example, the drive piston 22 may be a tip portion of the coupling rod 24, and the diameter of the drive piston 22 may be equal to the diameter of the coupling rod 24.

An axial reciprocating movement of the displacer 20 is guided by the displacer cylinder 26. In general, the displacer 20 and the displacer cylinder 26 are cylindrical members which respectively extend in the axial direction, and an inner diameter of the displacer cylinder 26 coincides with or slightly larger than an outer diameter of the displacer 20. Similarly, the axial reciprocating movement of the drive piston 22 is guided by the piston cylinder 28. In general, the drive piston 22 is a columnar member which extends in the axial direction. The piston cylinder 28 is a cylindrical member which extends in the axial direction, and the inner diameter of the piston cylinder 28 coincides with or slightly larger than the outer diameter of the drive piston 22.

The displacer 20 and the drive piston 22 are rigidly coupled with each other in the axial direction by the coupling rod 24. Accordingly, an axial stroke of the drive piston 22 is equal to an axial stroke of the displacer 20, and both of these integrally move over all strokes. A position of the drive piston 22 relative to the displacer 20 is unchanged during the axial reciprocating movement of the axially movable body 16.

In addition, the cold head housing 18 includes a coupling rod guide 30 which connects the displacer cylinder 26 to the piston cylinder 28. The coupling rod guide 30 extends coaxially with the displacer cylinder 26 and the piston cylinder 28 from the displacer cylinder 26 to the piston cylinder 28. The coupling rod 24 penetrates the coupling rod guide 30. The coupling rod guide 30 is configured to serve as a bearing which guides the axial reciprocating movement of the coupling rod 24.

The displacer cylinder 26 is coupled with the piston cylinder 28 in an airtight manner through the coupling rod guide 30. In this way, the cold head housing 18 is configured to serve as a pressure vessel for the working gas. The coupling rod guide 30 may be considered to be a portion of either the displacer cylinder 26 or the piston cylinder 28.

A first seal portion 32 is disposed between the coupling rod 24 and the coupling rod guide 30. The first seal portion 32 is mounted on one of the coupling rod 24 and the coupling rod guide 30, and slides on the other of the coupling rod 24 and the coupling rod guide 30. For example, the first seal portion 32 is configured to include a seal member such as a slipper seal or an O-ring. In addition, instead of the seal member, a gap may be extremely reduced between the coupling rod 24 and the coupling rod guide 30 so that the gap functions as a clearance seal. The piston cylinder 28 is configured to be airtight relative to the displacer cylinder 26 by the first seal portion 32. In this way, the piston cylinder 28 is fluidly isolated from the displacer cylinder 26, and there is no direct gas circulation between the piston cylinder 28 and the displacer cylinder 26.

The displacer cylinder 26 is divided into an expansion chamber 34 and a room temperature chamber 36 by the displacer 20. The displacer 20 forms the expansion chamber 34 with the displacer cylinder 26 in one end in the axial direction, and forms the room temperature chamber 36 with the displacer cylinder 26 in the other end in the axial direction. The expansion chamber 34 is located on a bottom dead center LP1 side, and the room temperature chamber 36 is located on a top dead center UP1 side. In addition, the cold head 14 is provided with a cooling stage 38 fixed to the displacer cylinder 26 so as to wrap the expansion chamber 34.

The regenerator 15 is incorporated in the displacer 20. An upper lid portion of the displacer 20 has an inlet flow path 40 which allows the regenerator 15 to communicate with the room temperature chamber 36. In addition, a cylinder portion of the displacer 20 has an outlet flow path 42 which allows the regenerator 15 to communicate with the expansion chamber 34. Alternatively, the outlet flow path 42 may be disposed in a lower lid portion of the displacer 20. In addition, the regenerator 15 includes an inlet retainer 41 inscribed in the upper lid portion, an outlet retainer 43 inscribed in the lower lid portion, and a regenerator material interposed between both the retainers. In FIG. 1, the regenerator material is illustrated as a dotted region interposed between the inlet retainer 41 and the outlet retainer 43. The regenerator material may be a copper wire mesh, for example. The retainer may be a wire mesh which is coarser than the regenerator material.

A second seal portion 44 is disposed between the displacer 20 and the displacer cylinder 26. For example, the second seal portion 44 is a slipper seal, and is mounted on the cylinder portion or the upper lid portion of the displacer 20. A clearance between the displacer 20 and the displacer cylinder 26 is sealed with the second seal portion 44. Accordingly, there is no direct gas circulation (that is, a gas flow bypassing the regenerator 15) between the room temperature chamber 36 and the expansion chamber 34.

When the displacer 20 moves in the axial direction, the expansion chamber 34 and the room temperature chamber 36 complementarily increase and decrease respective volumes. That is, when the displacer 20 moves downward, the expansion chamber 34 is narrowed, and the room temperature chamber 36 is widened. And vice versa.

The working gas flows into the regenerator 15 from the room temperature chamber 36 through the inlet flow path 40. More precisely, the working gas flows into the regenerator 15 from the inlet flow path 40 through the inlet retainer 41. The working gas flows into the expansion chamber 34 from the regenerator 15 by way of the outlet retainer 43 and the outlet flow path 42. When the working gas returns to the room temperature chamber 36 from the expansion chamber 34, the working gas passes a reverse path thereof. That is, the working gas returns to the room temperature chamber 36 from the expansion chamber 34 through the outlet flow path 42, the regenerator 15, and the inlet flow path 40. The working gas trying to flow into the clearance after bypassing the regenerator 15 is blocked by the second seal portion 44.

The piston cylinder 28 includes a drive chamber 46 whose pressure is controlled to drive the drive piston 22, and a gas spring chamber 48 divided from the drive chamber 46 by the drive piston 22. The drive piston 22 forms the drive chamber 46 with the piston cylinder 28 in one end in the axial direction, and forms the gas spring chamber 48 with the piston cylinder 28 in the other end in the axial direction.

When the drive piston 22 moves in the axial direction, the drive chamber 46 and the gas spring chamber 48 complementarily increase and decrease the respective volumes.

The drive chamber 46 is located on a side opposite to the displacer cylinder 26 in the axial direction with respect to the drive piston 22. The gas spring chamber 48 is located on a side the same as the displacer cylinder 26 in the axial direction with respect to the drive piston 22. In other words, the drive chamber 46 is located on a top dead center UP2 side, and the gas spring chamber 48 is located on a bottom dead center LP2 side. An upper surface of the drive piston 22 receives the gas pressure of the drive chamber 46, and a lower surface of the drive piston 22 receives the gas pressure of the gas spring chamber 48.

The coupling rod 24 extends to the coupling rod guide 30 from the lower surface of the drive piston 22 through the gas spring chamber 48. Furthermore, the coupling rod 24 extends to the upper lid portion of the displacer 20 through the room temperature chamber 36. The gas spring chamber 48 is located on the side the same as the coupling rod 24 with respect to the drive piston 22, and the drive chamber 46 is located on the side opposite to the coupling rod 24 with respect to the drive piston 22.

A third seal portion 50 is disposed between the drive piston 22 and the piston cylinder 28. For example, the third seal portion 50 is a slipper seal, and is mounted on to side surface of the drive piston 22. A clearance between the drive piston 22 and the piston cylinder 28 is sealed with the third seal portion 50. Accordingly, there is no direct gas circulation between the drive chamber 46 and the gas spring chamber 48. In addition, since the first seal portion 32 is provided, there is no gas circulation between the gas spring chamber 48 and the room temperature chamber 36. In this way, the gas spring chamber 48 is formed to be airtight relative to the displacer cylinder 26. The gas spring chamber 48 is sealed with the first seal portion 32 and the third seal portion 50.

The gas spring chamber 48 is narrowed when the drive piston 22 moves downward. At this time, the gas of the gas spring chamber 48 is compressed, and the pressure increases. The pressure of the gas spring chamber 48 acts upward on the lower surface of the drive piston 22. Accordingly, the gas spring chamber 48 generates a gas spring force which acts against the downward movement of the drive piston 22. Conversely, the gas spring chamber 48 is widened when the drive piston 22 moves upward. The pressure of the gas spring chamber 48 decreases, and the gas spring force acting on the drive piston 22 decreases.

The third seal portion 50 may not be provided. The clearance may be held between the drive piston 22 and the piston cylinder 28. The clearance may act as flow path resistance against the gas circulation between the drive chamber 46 and the gas spring chamber 48.

The cold head 14 is installed in an illustrated direction at a job site where the cold head 14 is used. That is, the cold head 14 is located vertically upward by locating the displacer cylinder 26 below in the vertical direction and locating the piston cylinder 28 above in the vertical direction. In this way, the GM cryocooler 10 has the highest refrigeration capacity when the cooling stage 38 is installed by adopting a downward facing posture in the vertical direction. However, an arrangement of the GM cryocooler 10 is not limited thereto. Conversely, the cold head 14 may be installed by adopting a posture in which the cooling stage 38 faces upward in the vertical direction. Alternatively, the cold head 14 may be installed sideways or in any other direction.

In a case where the cold head 14 is installed by adopting a posture in which the cooling stage 38 faces downward in the vertical direction, gravity acts downward as illustrated by an arrow D. Therefore, an empty weight of the axially movable body 16 acts to assist the downward drive force of the drive piston 22. A stronger drive force acts on the drive piston 22 when the drive piston 22 moves downward, compared to when the drive piston 22 moves upward. Accordingly, in the typical gas-driven GM cryocooler, collision or contact between the displacer and the displacer cylinder is likely to occur at the bottom dead center of the displacer.

However, the cold head 14 is provided with the gas spring chamber 48. The gas stored in the gas spring chamber 48 is compressed when the drive piston 22 moves downward, thereby increasing the pressure. The pressure acts in a direction opposite to the gravity. Accordingly, the drive force acting on the drive piston 22 decreases. It is possible to slow down the speed immediately before the drive piston 22 reaches the bottom dead center LP2.

In this way, it is possible to avoid contact or collision between the drive piston 22 and the piston cylinder 28, and/or the displacer 20 and the displacer cylinder 26. Alternatively, even if the collision occurs, collision sound is minimized since collision energy is reduced by the decreasing speed of the drive piston 22.

Furthermore, the GM cryocooler 10 includes a working gas circuit 52 which connects the compressor 12 to the cold head 14. The working gas circuit 52 is configured to generate a pressure difference between the piston cylinder 28 (that is, the drive chamber 46) and the displacer cylinder 26 (that is, the expansion chamber 34 and/or the room temperature chamber 36). The pressure difference causes the axially movable body 16 to move in the axial direction. If the pressure of the displacer cylinder 26 is lower than that of the piston cylinder 28, the drive piston 22 moves downward, and consequently, the displacer 20 also moves downward. Conversely, if the pressure of the displacer cylinder 26 is higher than that of the piston cylinder 28, the drive piston 22 moves upward, and consequently, the displacer 20 also moves upward.

The working gas circuit 52 includes a rotary valve 54. The rotary valve 54 may be located in the cold head housing 18 so as to be connected to the compressor 12 by using a pipe. The rotary valve 54 may be located outside the cold head housing 18 so as to be connected to each of the compressor 12 and the cold head 14 by using a pipe.

The rotary valve 54 includes a main pressure switching valve 60 and an auxiliary pressure switching valve 62. The main pressure switching valve 60 has a main intake on-off valve V1 and a main exhaust on-off valve V2. The auxiliary pressure switching valve 62 has an auxiliary intake on-off valve V3 and an auxiliary exhaust on-off valve V4.

The main pressure switching valve 60 is located in a main intake/exhaust flow path 64 which connects the compressor 12 to the room temperature chamber 36 of the cold head 14. The main intake/exhaust flow path 64 is bifurcated to the main intake path 64a and the main exhaust path 64b in the main pressure switching valve 60. The main intake on-off valve V1 is located in the main intake path 64a, and connects the compressor discharge port 12a to the room temperature chamber 36. The main exhaust on-off valve V2 is located in the main exhaust path 64b, and connects the compressor suction port 12b to the room temperature chamber 36.

The main pressure switching valve 60 is configured so that the compressor discharge port 12a or the compressor suction port 12b selectively communicates with the room temperature chamber 36 of the displacer cylinder 26. In the main pressure switching valve 60, the main intake on-off valve V1 and the main exhaust on-off valve V2 are respectively and exclusively opened. That is, the main intake on-off valve V1 and the main exhaust on-off valve V2 are inhibited from being opened at the same time. When the main intake on-off valve V1 is open, the main exhaust on-off valve V2 is closed. The working gas is supplied from the compressor discharge port 12a to the displacer cylinder 26 through the main intake/exhaust flow path 64. On the other hand, when the main exhaust on-off valve V2 is open, the main intake on-off valve V1 is closed. The working gas is collected to the compressor suction port 12b from the displacer cylinder 26 through the main intake/exhaust flow path 64. The main intake on-off valve V1 and the main exhaust on-off valve V2 may be temporarily closed together. In this way, the displacer cylinder 26 is alternately connected to the compressor discharge port 12a and the compressor suction port 12b.

The auxiliary pressure switching valve 62 is located in the auxiliary intake/exhaust flow path 66 which connects the compressor 12 to the drive chamber 46 of the piston cylinder 28. The auxiliary intake/exhaust flow path 66 is bifurcated to the auxiliary intake path 66a and the auxiliary exhaust path 66b in the auxiliary pressure switching valve 62. The auxiliary intake on-off valve V3 is located in the auxiliary intake path 66a, and connects the compressor discharge port 12a to the drive chamber 46. The auxiliary exhaust on-off valve V4 is located in the auxiliary exhaust path 66b, and connects the compressor suction port 12b to the drive chamber 46.

The auxiliary pressure switching valve 62 is configured so that the compressor discharge port 12a or the compressor suction port 12b selectively communicates with the drive chamber 46 of the piston cylinder 28. The auxiliary pressure switching valve 62 is configured so that the auxiliary intake on-off valve V3 and the auxiliary exhaust on-off valve V4 are respectively and exclusively opened. That is, the auxiliary intake on-off valve V3 and the auxiliary exhaust on-off valve V4 are inhibited from being opened at the same time. When the auxiliary intake on-off valve V3 is open, the auxiliary exhaust on-off valve V4 is closed. The working gas is supplied from the compressor discharge port 12a to the drive chamber 46 through the auxiliary intake/exhaust flow path 66. On the other hand, when the auxiliary exhaust on-off valve V4 is open, the auxiliary intake on-off valve V3 is closed. The working gas is collected to the compressor suction port 12b from the drive chamber 46 through the auxiliary intake/exhaust flow path 66. The auxiliary intake on-off valve V3 and the auxiliary exhaust on-off valve V4 may be temporarily closed together. In this way, the drive chamber 46 is alternately connected to the compressor discharge port 12a and the compressor suction port 12b.

Although details will be described later, a group of the valves (V1 to V4) can be operated in accordance with a cooling valve timing for cooling the GM cryocooler 10, or in accordance with a heating valve timing for heating the GM cryocooler 10.

The group of valves (V1 to V4) is incorporated in the rotary valve 54, and is synchronously driven. The rotary valve 54 is configured so that the valves (V1 to V4) are properly switched by rotational sliding of the valve disc (or the valve rotor) with respect to the valve main body (or the valve stator). The group of valves (V1 to V4) is switched in the same cycle during the operation of the GM cryocooler 10, thereby causing the four on-off valves (V1 to V4) to periodically change an open/closed state. The four on-off valves (V1 to V4) are open and closed in respectively different phases.

The GM cryocooler 10 includes a reversible motor 56 coupled with the rotary valve 54 so as to rotate the rotary valve 54 around the rotary valve rotation axis. The reversible motor 56 is mechanically coupled with the rotary valve 54. The rotary valve 54 is configured to be operated in accordance with the cooling valve timing, when the reversible motor 56 is rotated forward, and to be operated in accordance with the heating valve timing, when the reversible motor 56 is rotated rearward.

The GM cryocooler 10 may include a motor control unit 58 that controls the rotation direction of the reversible motor 56. The motor control unit 58 may be configured to switch the rotation directions of the reversible motor 56 in accordance with an input from a user. For example, the motor control unit 58 may include a switching switch operated by the user. The switching switch is operated, thereby reversely changing the rotation direction of the reversible motor 56 (switching from forward rotation to rearward rotation, or rearward rotation to forward rotation).

The rotary valve unit for the GM cryocooler 10 includes the rotary valve 54 and the reversible motor 56. The rotary valve unit may include the motor control unit 58. The rotary valve unit may be integrally mounted on the cold head 14 of the GM cryocooler 10. Alternatively, the rotary valve unit may be provided separately from the cold head 14 so as to be connected to the cold head 14 by using a pipe.

Figure 2:
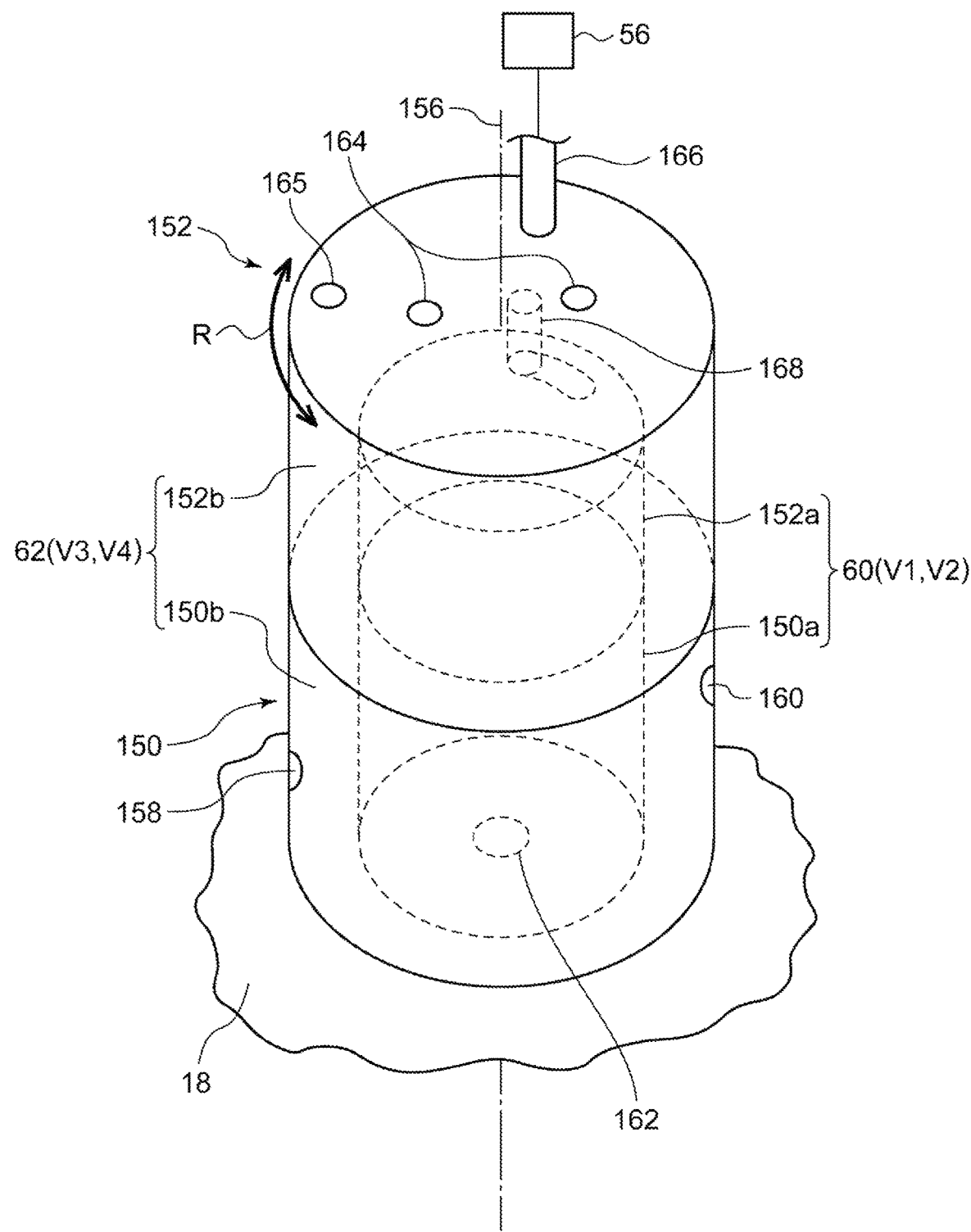
FIG. 2 is a schematic perspective view illustrating a rotary valve unit according to the embodiment.

FIG. 2 is a schematic perspective view illustrating the rotary valve unit according to the embodiment. In order to facilitate understanding, a portion of an internal structure is illustrated using a broken line.

The rotary valve 54 includes a valve stator 150 and a valve rotor 152. In a case where the rotary valve 54 is accommodated in the cold head housing 18, the valve stator 150 is fixed to the cold head housing 18. In a case where the rotary valve 54 is provided separately from the cold head 14, the valve stator 150 is fixed to a valve housing which accommodates the rotary valve 54 or other stationary portions.

The valve stator 150 includes a first valve stator 150a and a second valve stator 150b. Both the first valve stator 150a and the second valve stator 150b are fixed to the cold head housing 18 or other stationary portions. The first valve stator 150a and the second valve stator 150b are formed in a cylindrical shape, and are arranged coaxially with a rotary valve rotation axis (hereinafter, referred to as a rotation axis) 156. The second valve stator 150b is located outside the first valve stator 150a so as to surround the first valve stator 150a. The cylindrical surface disposed inside the second valve stator 150b is in contact with the cylindrical surface disposed outside the first valve stator 150a.

In this way, the valve stator 150 is divided into two stator components. However, the dividing is not essential, and the valve stator 150 may be a single component.

The valve stator 150 has a cylinder port 158 and a drive chamber port 160. The rotary valve 54 is connected to the room temperature chamber 36 illustrated in FIG. 1 through the cylinder port 158, and fluidly communicates with the displacer cylinder 26. The cylinder port 158 corresponds to the main intake/exhaust flow path 64 illustrated in FIG. 1. In addition, the rotary valve 54 is connected to the drive chamber 46 illustrated in FIG. 1 through the drive chamber port 160, and fluidly communicates with the piston cylinder 28. The drive chamber port 160 corresponds to the auxiliary intake/exhaust flow path 66 illustrated in FIG. 1.

The cylinder port 158 and the drive chamber port 160 are open on a cylinder side surface of the second valve stator 150b. The cylinder port 158 and the drive chamber port 160 are arranged on mutually opposite sides across the rotation axis 156. The cylinder port 158 penetrates both the contact surfaces from the second valve stator 150b to the first valve stator 150a. In order to seal the cylinder port 158 and the drive chamber port 160 with each other by using a seal member such as an O-ring on the contact surface between the second valve stator 150b and the first valve stator 150a, the cylinder port 158 and the drive chamber port 160 are located at different positions in a direction of the rotation axis 156.

In addition, the valve stator 150 has a high-pressure port 162. The rotary valve 54 is connected to the compressor discharge port 12a illustrated in FIG. 1 through the high-pressure port 162, and fluidly communicates with the compressor 12. The high-pressure port 162 corresponds to the main intake path 64a and the auxiliary intake path 66a illustrated in FIG. 1. The high-pressure port 162 is open on a bottom surface (that is, surface on a side opposite to the valve rotor 152 in the direction of the rotation axis 156) of the first valve stator 150a.

The valve rotor 152 is coupled with the reversible motor 56 so as to be rotated around the rotation axis 156 relative to the valve stator 150. For example, the valve rotor 152 is coupled with an output shaft of the reversible motor 56 via a rotation transmission mechanism 166 such as a crank mechanism, on one end side in the direction of the rotation axis 156. The valve rotor 152 may be directly coupled with the output shaft of the reversible motor 56. As illustrated by an arrow R, the valve rotor 152 can be rotated around the rotation axis 156 in both forward and rearward directions.

In addition, the valve rotor 152 is in surface contact with the valve stator 150 so as to rotationally slide on the valve stator 150, on the other end side in the direction of the rotation axis 156. The surface contact between the valve rotor 152 and the valve stator 150 holds airtightness of the working gas circulating through the valve stator 150 and the valve rotor 152. In other words, the contact surface pressure between the valve rotor 152 and the valve stator 150 is used. In this manner, a high-pressure gas flow path and a low-pressure gas flow path which penetrate a rotational sliding surface between the valve rotor 152 and the valve stator 150 are sealed with each other.

The valve rotor 152 includes a first valve rotor 152a and a second valve rotor 152b. The first valve rotor 152a and the second valve rotor 152b are coupled with the reversible motor 56 so as to be rotated around the rotation axis 156 relative to the valve stator 150. The first valve rotor 152a is configured to be rotated so as to alternately connect the displacer cylinder 26 to the compressor discharge port and the compressor suction port. The second valve rotor 152b is configured to be rotated so as to alternately connect the piston cylinder 28 to the compressor discharge port and the compressor suction port. An internal flow path configuration of the rotary valve 54 will be described later.

The first valve rotor 152a and the second valve rotor 152b are formed in a cylindrical shape, and are arranged coaxially with the rotation axis 156. The second valve rotor 152b is located outside the first valve rotor 152a so as to surround the first valve rotor 152a. The cylindrical surface disposed inside the second valve rotor 152b is in contact with the cylindrical surface disposed outside the first valve rotor 152a. The second valve rotor 152b is configured so that one end side is closed, and the other end side is open in the direction of the rotation axis 156, and has a recess portion to which the first valve rotor 152a is fitted. An upper surface (surface on a side opposite to the valve stator 150 in the direction of the rotation axis 156) of the first valve rotor 152a is in contact with a closed end portion of the second valve rotor 152b.

In this way, the valve rotor 152 is divided into two rotor components.

The valve rotor 152 has a main low-pressure port 164 and an auxiliary low-pressure port 165. The rotary valve 54 is connected to the compressor suction port 12b illustrated in FIG. 1 through the main low-pressure port 164 and the auxiliary low-pressure port 165, and fluidly communicates with the compressor 12. The main low-pressure port 164 corresponds to the main exhaust path 64b illustrated in FIG. 1. The auxiliary low-pressure port 165 corresponds to the auxiliary exhaust path 66b illustrated in FIG. 1. The main low-pressure port 164 and the auxiliary low-pressure port 165 are open on the upper surface of the second valve rotor 152b. In the drawing, the main low-pressure port 164 includes two gas outlets, but the number of the gas outlets may be only one.

The first valve rotor 152a is in surface contact with the first valve stator 150a so as to rotationally slide on the first valve stator 150a. The outer diameter of the first valve rotor 152a coincides with the outer diameter of the first valve stator 150a. The second valve rotor 152b is in surface contact with the second valve stator 150b so as to rotationally slide on the second valve stator 150b. The inner diameter and the outer diameter of the second valve rotor 152b coincide with the inner diameter and the outer diameter of the second valve stator 150b. The second valve rotor 152b and the second valve stator 150b may have mutually different outer diameters.

A combination of the first valve stator 150a and the first valve rotor 152a configures the main pressure switching valve 60 illustrated in FIG. 1, that is, the main intake on-off valve V1 and the main exhaust on-off valve V2. A combination of the second valve stator 150b and the second valve rotor 152b configures the auxiliary pressure switching valve 62 illustrated in FIG. 1, that is, the auxiliary intake on-off valve V3 and the auxiliary exhaust on-off valve V4.

The first valve rotor 152a and the second valve rotor 152b are coupled with each other by a valve rotor coupling mechanism 168. The valve rotor coupling mechanism 168 couples the first valve rotor 152a and the second valve rotor 152b with each other as follows. When the reversible motor 56 is rotated forward, the first valve rotor 152a holds a first relative angle with the second valve rotor 152b so that both the valve rotors are rotated around the rotation axis 156. When the reversible motor 56 is rotated rearward, the first valve rotor 152a holds a second relative angle with the second valve rotor 152b so that both the valve rotors are rotated around the rotation axis 156. The rotation of the reversible motor 56 is transmitted to the second valve rotor 152b via the rotation transmission mechanism 166 (or directly), and the rotation of the second valve rotor 152b is transmitted to the first valve rotor 152a via the valve rotor coupling mechanism 168. In this way, the first valve rotor 152a and the second valve rotor 152b are integrally rotated.

The valve rotor coupling mechanism 168 is configured to change a relative position between the first valve rotor 152a and the second valve rotor 152b in response to a reverse in rotation direction of the reversible motor 56. More specifically, the valve rotor coupling mechanism 168 is configured to switch between the first relative angle and the second relative angle in response to the reverse in rotation direction of the reversible motor 56. Details of the valve rotor coupling mechanism 168 will be described later.

The second relative angle is different from the first relative angle. Although details will be described later, the first relative angle is designed to cool the GM cryocooler 10. The second relative angle is designed to heat the GM cryocooler 10. The second relative angle may be shifted from the first relative angle as much as an angle selected from a range of 30° to 60°. The second relative angle may be shifted from the first relative angle as much as approximately 45°. In this case, when the reversible motor 56 is rotated forward, the rotary valve 54 can be operated in accordance with the cooling valve timing. When the reversible motor 56 is rotated rearward, the rotary valve 54 can be operated in accordance with the heating valve timing.

The flow path configuration of the rotary valve 54 will be described with reference to FIGS. 3A to 5B.

FIGS. 3A to 3E are schematic plan views illustrating the rotational sliding surface of the rotary valve unit according to the embodiment. FIG. 3A illustrates a surface of the valve stator 150 coming into surface contact with the valve rotor 152, and FIGS. 3B to 3E illustrate a surface of the valve rotor 152 coming into surface contact with the valve stator 150. FIGS. 3B to 3E illustrate some examples of the relative position between the first valve rotor 152a and the second valve rotor 152b with regard to the valve rotor 152.

FIGS. 4A, 4B, 5A, and 5B are schematic sectional views for describing the internal flow path configuration of the rotary valve 54. In order to facilitate understanding, as an example of the valve rotor 152 illustrated in FIG. 3D, FIG. 4A illustrates a state where the main intake on-off valve V1 and the auxiliary intake on-off valve V3 are open (that is, a state where the main exhaust on-off valve V2 and the auxiliary exhaust on-off valve V4 are closed). In addition, as an example of the valve rotor 152 illustrated in FIG. 3D, FIG. 4B illustrates a state where the main exhaust on-off valve V2 and the auxiliary exhaust on-off valve V4 are open (that is, a state where the main intake on-off valve V1 and the auxiliary intake on-off valve V3 are closed).

In addition, as an example of the valve rotor 152 illustrated in FIG. 3E, FIG. 5A illustrates a state where the main intake on-off valve V1 and the auxiliary intake on-off valve V3 are open (that is, a state where the main exhaust on-off valve V2 and the auxiliary exhaust on-off valve V4 are closed). In addition, as an example of the valve rotor 152 illustrated in FIG. 3E, FIG. 5B illustrates a state where the main exhaust on-off valve V2 and the auxiliary exhaust on-off valve V4 are open (that is, a state where the main intake on-off valve V1 and the auxiliary intake on-off valve V3 are closed). FIGS. 4A to 5B illustrate each cross section including the rotation axis 156.

As illustrated in FIG. 3A, the first valve stator 150a has a first stator flat surface 170a, and the second valve stator 150b has a second stator flat surface 170b. The first stator flat surface 170a is an end surface of the first valve stator 150a, and the second stator flat surface 170b is an end surface of the second valve stator 150b. As described above, the valve stator 150 has a double cylindrical structure having the first valve stator 150a and the second valve stator 150b which serve as inner and outer cylinders. Accordingly, the first stator flat surface 170a has a circular region, and the second stator flat surface 170b has an annular region surrounding the first stator flat surface 170a. The first stator flat surface 170a and the second stator flat surface 170b are located at substantially the same height in the direction of the rotation axis 156. Accordingly, the first stator flat surface 170a and the second stator flat surface 170b are on substantially the same plane.

The high-pressure port 162 and the cylinder port 158 are open on the first stator flat surface 170a. The high-pressure port 162 is located at the center of the first stator flat surface 170a. That is, the high-pressure port 162 penetrates the first valve stator 150a in the direction of the rotation axis 156. The cylinder port 158 penetrates from the outer peripheral portion of the first stator flat surface 170a to the cylinder side surface of the second valve stator 150b. That is, the cylinder port 158 enters the first valve stator 150a in the direction of the rotation axis 156, is bent outward in the radial direction, and is open on the cylinder side surface of the first valve stator 150a. Then, the cylinder port 158 is connected to a hole penetrating the second valve stator 150b in the radial direction.

The drive chamber port 160 is open on the second stator flat surface 170b. The drive chamber port 160 is located on a side opposite to the cylinder port 158 across the high-pressure port 162 (that is, the rotation axis 156). The drive chamber port 160 enters the second valve stator 150b from the second stator flat surface 170b in the direction of the rotation axis 156, is bent outward in the radial direction, and penetrates the cylinder side surface of the second valve stator 150b.

As illustrated in FIG. 3B, the first valve rotor 152a has a first rotor flat surface 172a coming into surface contact with the first stator flat surface 170a, and the second valve rotor 152b has a second rotor flat surface 172b coming into surface contact with the second stator flat surface 170b. The first rotor flat surface 172a is an end surface of the first valve rotor 152a, and the second rotor flat surface 172b is an end surface of the second valve rotor 152b. As described above, the valve rotor 152 has a double cylindrical structure having the first valve rotor 152a and the second valve rotor 152b which serve as inner and outer cylinders. Accordingly, the first rotor flat surface 172a has a circular region, and the second rotor flat surface 172b has an annular region surrounding the first rotor flat surface 172a. The first valve stator 150a and the second valve stator 150b are located at substantially the same height in the direction of the rotation axis 156. Accordingly, the first valve stator 150a and the second valve stator 150b are on substantially the same plane.

A first rotor high-pressure flow path 174 is open on the first rotor flat surface 172a. The first rotor high-pressure flow path 174 defines a rectangular or oblong gas inlet extending outward in the radial direction from a center portion of the first rotor flat surface 172a, on the first rotor flat surface 172a. The gas inlet extends in the radial direction of the first rotor flat surface 172a. However, the first rotor high-pressure flow path 174 does not reach the cylinder side surface of the first valve rotor 152a. A radial length of the first rotor high-pressure flow path 174 is substantially equal to a radial length from the high-pressure port 162 to the cylinder port 158 on the first stator flat surface 170a. The outer peripheral portion of the first rotor high-pressure flow path 174 and the cylinder port 158 are located on substantially the same circumference around the rotation axis 156.

The center portion of the first rotor high-pressure flow path 174 penetrates from the first rotor flat surface 172a to the upper surface (end surface on a side opposite to the first rotor flat surface 172a) of the first valve rotor 152a in the direction of the rotation axis 156 (refer to FIG. 4A). The first rotor high-pressure flow path 174 is always connected to the high-pressure port 162.

In addition, the first rotor low-pressure flow path 176 is open on the first rotor flat surface 172a. The radial length from the rotation axis 156 to the first rotor low-pressure flow path 176 on the first rotor flat surface 172a is substantially equal to the radial length from the rotation axis 156 to the cylinder port 158 on the first stator flat surface 170a. The first rotor low-pressure flow path 176 and the cylinder port 158 are located on substantially the same circumference around the rotation axis 156. The first rotor low-pressure flow path 176 is located on a side opposite to the rotation axis 156 relative to the first rotor high-pressure flow path 174. The first rotor low-pressure flow path 176 penetrates from the first rotor flat surface 172a to the upper surface of the first valve rotor 152a in the direction of the rotation axis 156 (refer to FIG. 4A).

The auxiliary low-pressure port 165 and the second rotor high-pressure flow path 178 are open on the second rotor flat surface 172b. The auxiliary low-pressure port 165, the second rotor high-pressure flow path 178, and the drive chamber port 160 on the second stator flat surface 170b are located on substantially the same circumference around the rotation axis 156. The auxiliary low-pressure port 165 penetrates up to the upper surface of the second valve rotor 152b in the direction of the rotation axis 156. The second rotor high-pressure flow path 178 is bent inside the second valve rotor 152b, and extends to the first rotor high-pressure flow path 174 (refer to FIG. 4A). The second rotor high-pressure flow path 178 is always connected to the first rotor high-pressure flow path 174 on the upper surface of the first valve rotor 152a.

Figure 7:
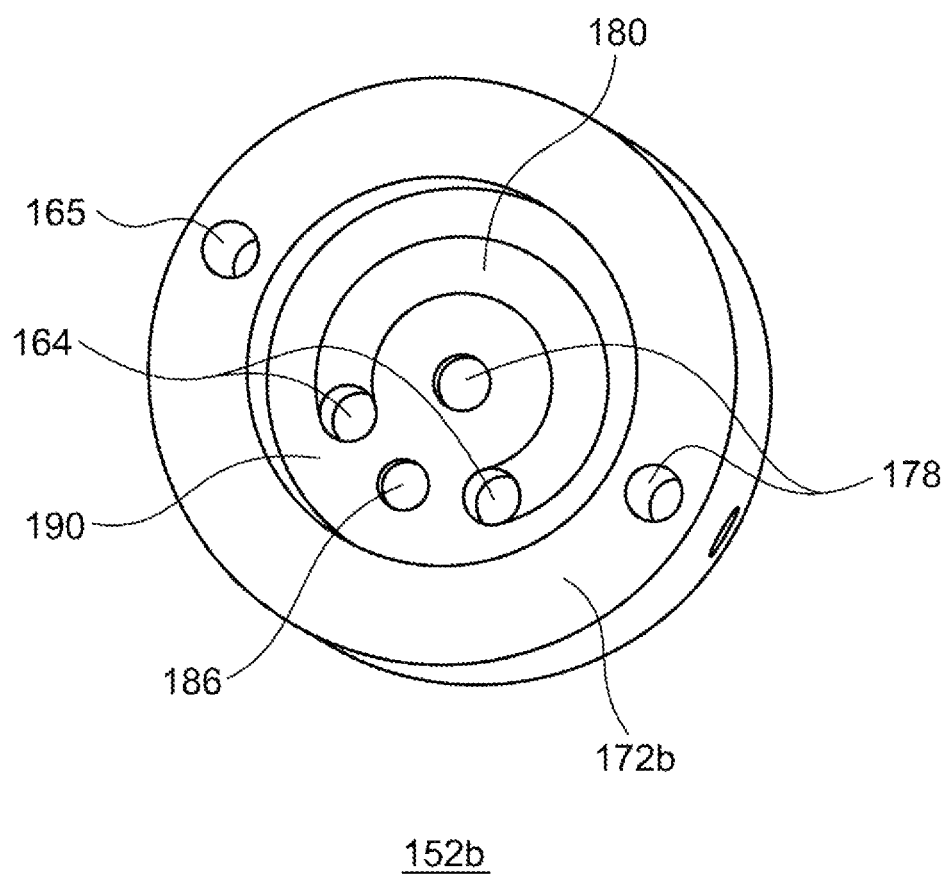
FIG. 7 is a schematic perspective view illustrating the second valve rotor according to the embodiment.

As illustrated in FIG. 4A, the main low-pressure port 164 penetrates the second valve rotor 152b from the upper surface of the second valve rotor 152b. Then, the main low-pressure port 164 includes an arc-shaped low-pressure groove 180. In the arc-shaped low-pressure groove 180, the first valve rotor 152a is formed on a surface (that is, a surface of the second valve rotor 152b facing the upper surface of the first valve rotor 152a) coming into contact with the second valve rotor 152b (illustrated by a broken line). As also illustrated in FIG. 7, the arc-shaped low-pressure groove 180 and the first rotor low-pressure flow path 176 are located on substantially the same circumference around the rotation axis 156. The first rotor low-pressure flow path 176 is always connected to the main low-pressure port 164 through the arc-shaped low-pressure groove 180. In this way, the main low-pressure port 164 is formed in the second valve rotor 152b so as to avoid the second rotor high-pressure flow path 178.

FIG. 3B illustrates a relative position between the first valve rotor 152a and the second valve rotor 152b when the reversible motor 56 is rotated forward. The first valve rotor 152a has a first relative angle 68 with respect to the second valve rotor 152b. While the first valve rotor 152a holds the first relative angle 68 with the second valve rotor 152b around the rotation axis 156, the valve rotor 152 is rotated in a forward rotation direction 72. In this manner, the rotary valve 54 is operated at the cooling valve timing. FIG. 3B simultaneously illustrates a center line 74 of the first rotor flat surface 172a passing through the first rotor high-pressure flow path 174 and the first rotor low-pressure flow path 176, and a center line 76 of the second rotor flat surface 172b passing through the auxiliary low-pressure port 165 and the second rotor high-pressure flow path 178. The first relative angle 68 can be represented as an angle formed between the center line 74 of the first rotor flat surface 172a and the center line 76 of the second rotor flat surface 172b. Here, the first relative angle 68 is 45°.

FIG. 3C illustrates a relative position between the first valve rotor 152a and the second valve rotor 152b when the reversible motor 56 is rotated rearward. The first valve rotor 152a has a second relative angle 70 with respect to the second valve rotor 152b. While the first valve rotor 152a holds the second relative angle 70 around the second valve rotor 152b and the rotation axis 156, the valve rotor 152 is rotated in a rearward rotation direction 80. In this manner, the rotary valve 54 is operated at the heating valve timing. The second relative angle 70 can be represented as an angle formed between the center line 74 of the first rotor flat surface 172a and the center line 76 of the second rotor flat surface 172b. Here, the second relative angle 70 is 90°. Therefore, the second relative angle 70 is shifted from the first relative angle 68 as much as 45°.

In this way, angular relative positional relationships between the first valve rotor 152a and the second valve rotor 152b are different from each other at the cooling valve timing and the heating valve timing. As will be understood from the comparison between FIGS. 3B and 3C, the first valve rotor 152a is rotated 45° with respect to the second valve rotor 152b.

As another example, FIG. 3D illustrates a case where a relative angle between the first valve rotor 152a and the second valve rotor 152b is 0°. FIG. 3E illustrates a case where the relative angle between the first valve rotor 152a and the second valve rotor 152b is 180°.

As illustrated in FIG. 3B, the first valve rotor 152a has a first cylindrical surface 173a, and the second valve rotor 152b has a second cylindrical surface 173b. The first cylindrical surface 173a is a side surface of the first valve rotor 152a, and the second cylindrical surface 173b is an inner side surface of the second valve rotor 152b. The first cylindrical surface 173a and the second cylindrical surface 173b are in contact with each other.

The rotary valve 54 is configured so that the inlet/outlet of the working gas flow path does not exist on either the first cylindrical surface 173a or the second cylindrical surface 173b. The whole working gas flow path of the first valve rotor 152a penetrates from the first rotor flat surface 172a serving as the rotational sliding surface to the upper surface which is a surface opposite thereto. The working gas flow path of the second valve rotor 152b penetrates from the second rotor flat surface 172b serving as the rotational sliding surface to the upper surface or the contact surface of the first valve rotor 152a.

In this case, the working gas flow path does not exist. Accordingly, it is not necessary to provide a seal member such as an O-ring between the first cylindrical surface 173a and the second cylindrical surface 173b. If the seal member is provided, the relative rotation of the second valve rotor 152b with respect to the first valve rotor 152a may cause the seal member to be undesirably deformed. As a result, durability of the seal member may be affected.

In a certain embodiment, the rotary valve 54 may be configured so that the inlet/outlet of the working gas flow path exists on the first cylindrical surface 173a and the second cylindrical surface 173b. In this case, the seal member such as the O-ring may be provided between the first cylindrical surface 173a and the second cylindrical surface 173b.

In order to improve slidability in the relative rotation, it is desirable that the first valve rotor 152a and the second valve rotor 152b are formed of mutually different materials. Similarly, in order to achieve satisfactory slidability, it is desirable that the valve stator 150 and the valve rotor 152 are formed of mutually different materials. For example, in a case where one of two sliding components is formed of a metal material (for example, aluminum or iron) and the other is formed of a resin material (for example, an engineering plastic material or a fluorine resin material), the satisfactory slidability can be achieved.

Therefore, the first stator flat surface 170a may be formed of the resin material, the second stator flat surface 170b may be formed of the metal material, the first rotor flat surface 172a may be formed of the metal material, and the second rotor flat surface 172b may be formed of the resin material. Alternatively, the first stator flat surface 170a may be formed of the metal material, the second stator flat surface 170b may be formed of the resin material, and the first rotor flat surface 172a may be formed of the resin material, the second rotor flat surface 172b may be formed of the metal material. Here, only a portion of the valve rotor including the rotor flat surface or only a portion of the valve stator including the stator flat surface may be formed of a desired material. Alternatively, the whole valve stator or the whole valve rotor may be formed of the desired material.

In the rotary valve 54, the main intake on-off valve V1 is configured to include the high-pressure port 162, the first rotor high-pressure flow path 174, and the cylinder port 158. When the first rotor high-pressure flow path 174 overlaps the cylinder port 158 during the rotation of the valve rotor 152, the high-pressure port 162 is connected to the cylinder port 158. The high-pressure working gas can flow into the cylinder port 158 from the high-pressure port 162 through the first rotor high-pressure flow path 174. This is an open state of the main intake on-off valve V1 (refer to FIGS. 4A and 5A). On the other hand, when the first rotor high-pressure flow path 174 does not overlap the cylinder port 158, the high-pressure port 162 is disconnected from the cylinder port 158. Accordingly, the working gas cannot flow into the cylinder port 158 from the high-pressure port 162. This is a closed state of the main intake on-off valve V1 (refer to FIGS. 4B and 5B).

The main exhaust on-off valve V2 is configured to include the cylinder port 158, the first rotor low-pressure flow path 176, and the main low-pressure port 164. When the first rotor low-pressure flow path 176 overlaps the cylinder port 158 during the rotation of the valve rotor 152, the cylinder port 158 is connected to the main low-pressure port 164. The low-pressure working gas can flow to the main low-pressure port 164 from the cylinder port 158 through the first rotor low-pressure flow path 176. This is an open state of the main exhaust on-off valve V2 (refer to FIGS. 4B and 5B). On the other hand, when the first rotor low-pressure flow path 176 does not overlap the cylinder port 158, the main low-pressure port 164 is disconnected from the cylinder port 158. Accordingly, the working gas cannot flow to the main low-pressure port 164 from the cylinder port 158. This is a closed state of the main exhaust on-off valve V2 (refer to FIGS. 4A and 5A).

The auxiliary intake on-off valve V3 is configured to include the high-pressure port 162, the first rotor high-pressure flow path 174, the second rotor high-pressure flow path 178, and the drive chamber port 160. When the second rotor high-pressure flow path 178 overlaps the drive chamber port 160 during the rotation of the valve rotor 152, the high-pressure port 162 is connected to the drive chamber port 160. The high-pressure working gas can flow into the drive chamber port 160 from the high-pressure port 162 through the first rotor high-pressure flow path 174 and the second rotor high-pressure flow path 178. This is an open state of the auxiliary intake on-off valve V3 (refer to FIGS. 4A and 5A). On the other hand, when the second rotor high-pressure flow path 178 does not overlap the drive chamber port 160, the high-pressure port 162 is disconnected from the drive chamber port 160. Accordingly, the working gas cannot flow to the drive chamber port 160 from the high-pressure port 162. This is a closed state of the auxiliary intake on-off valve V3 (FIGS. 4B and 5B).

The auxiliary on-off valve V4 is configured to include the drive chamber port 160 and the auxiliary low-pressure port 165. When the auxiliary low-pressure port 165 overlaps the drive chamber port 160 during the rotation of the valve rotor 152, the drive chamber port 160 is connected to the auxiliary low-pressure port 165. Accordingly, the low-pressure working gas can flow to the auxiliary low-pressure port 165 from the drive chamber port 160. This is an open state of the auxiliary exhaust on-off valve V4 (refer to FIGS. 4B and 5B). On the other hand, when the auxiliary low-pressure port 165 does not overlap the drive chamber port 160, the drive chamber port 160 is disconnected from the auxiliary low-pressure port 165. Accordingly, the working gas cannot flow to the auxiliary low-pressure port 165 from the drive chamber port 160. This is a closed state of the auxiliary exhaust on-off valve V4 (refer to FIGS. 4A and 5A).

Figure 6:
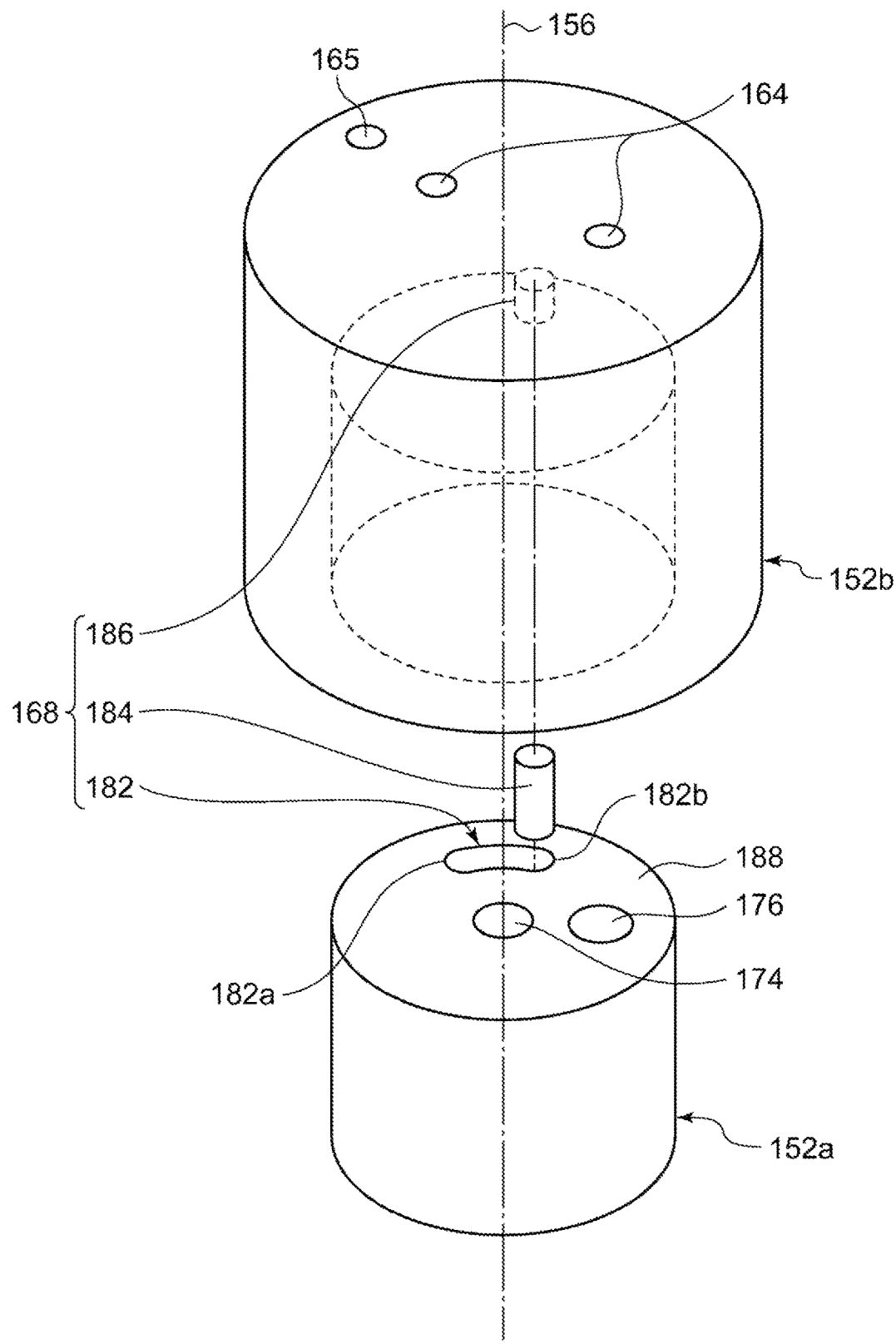
FIG. 6 is a schematic perspective exploded view illustrating a first valve rotor and a second valve rotor according to the embodiment.

An exemplary configuration of the valve rotor coupling mechanism 168 will be described with reference to FIGS. 6 and 7. FIG. 6 is a schematic perspective exploded view illustrating the valve rotor 152 according to the embodiment, and FIG. 7 is a schematic perspective view illustrating the second valve rotor 152b according to the embodiment. FIG. 7 illustrates a recess portion formed in the second valve rotor 152b for receiving the first valve rotor 152a, together with the second rotor flat surface 172b.

The valve rotor coupling mechanism 168 includes a coupling pin guide groove 182, a coupling pin 184, and a coupling pin fixing hole 186. The coupling pin guide groove 182 is formed on an upper surface 188 of the first valve rotor 152a. The coupling pin guide groove 182 is formed in an arc shape around the rotation axis 156. The coupling pin guide groove 182 has a first groove end portion 182a and a second groove end portion 182b. The first groove end portion 182a and the second groove end portion 182b correspond to both ends of the coupling pin guide groove 182 in the circumferential direction. A size of a central angle of the coupling pin guide groove 182 corresponds to a phase difference between the first relative angle and the second relative angle. Therefore, the size of the central angle of the coupling pin guide groove 182 is an angle selected from a range of 30° to 60°, for example. In the present embodiment, the size of the central angle of the coupling pin guide groove 182 is approximately 45°.

The coupling pin 184 is fixedly supported by the second valve rotor 152b. The coupling pin 184 extends parallel to the rotation axis 156. One end of the coupling pin 184 is inserted into the coupling pin guide groove 182, and the other end is attached to the coupling pin fixing hole 186. The coupling pin 184 may be fitted and fixed to the coupling pin fixing hole 186, or may be inserted into the coupling pin fixing hole 186 with slight play. The coupling pin fixing hole 186 is formed in the second valve rotor 152b. The coupling pin fixing hole 186 is formed on a contact surface 190 where the second valve rotor 152b comes into contact with the upper surface 188 of the first valve rotor 152a. The coupling pin guide groove 182 and the coupling pin fixing hole 186 are located on the same circumference around the rotation axis 156. The coupling pin fixing hole 186 is also located on the circumference the same as that of the arc-shaped low-pressure groove 180.

The coupling pin 184 engages with the first groove end portion 182a of the coupling pin guide groove 182 so that the first valve rotor 152a holds the first relative angle with the second valve rotor 152b when the reversible motor 56 illustrated in FIGS. 1 and 2 is rotated forward. In addition, the coupling pin 184 engages with the second groove end portion 182b of the coupling pin guide groove 182 so that the first valve rotor 152a holds the second relative angle with the second valve rotor 152b when the reversible motor 56 is rotated rearward. The coupling pin guide groove 182 is formed so as to guide the coupling pin 184 from the first groove end portion 182a to the second groove end portion 182b when the reversible motor 56 is switched from the forward rotation to the rearward rotation, and so as to guide the coupling pin 184 from the second groove end portion 182b to the first groove end portion 182a when the reversible motor 56 is switched from the rearward rotation to the forward rotation.

Therefore, when the reversible motor 56 is switched from the forward rotation to the rearward rotation, the second valve rotor 152b is angularly displaced with respect to the first valve rotor 152a, and the relative angles between both the valve rotors are switched from the first relative angle to the second relative angle. In addition, when the reversible motor 56 is switched from the rearward rotation to the forward rotation, the second valve rotor 152b is angularly displaced with respect to the first valve rotor 152a, and the relative angles between both the valve rotors are switched from the second relative angle to the first relative angle.

In this case, a relatively simple structure such as a combination of the coupling pin guide groove 182 and the coupling pin 184 enables the relative angles between the first valve rotor 152a and the second valve rotor 152b to be switched.

The coupling pin guide groove 182 may be formed in the second valve rotor 152b, and the coupling pin 184 may be fixedly supported by the first valve rotor 152a. The coupling pin fixing hole 186 may be formed in the first valve rotor 152a.

FIG. 7 illustrates the arc-shaped low-pressure groove 180 formed on the contact surface 190 of the second valve rotor 152b. A central angle of the arc-shaped low-pressure groove 180 may be larger than or equal to a phase difference between the first relative angle and the second relative angle. In the present embodiment, the central angle of the arc-shaped low-pressure groove 180 is approximately 270°, and is larger than approximately 45° of the phase difference between the first relative angle and the second relative angle. In this case, even if the relative angles of both the valve rotors are switched, the main low-pressure port 164 can be always connected to the first rotor low-pressure flow path 176 through the arc-shaped low-pressure groove 180.

Figure 8A:
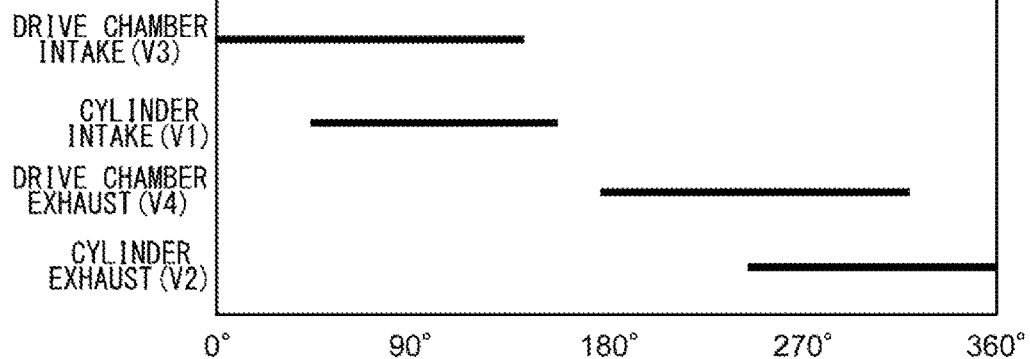
FIGS. 8A to 8C are views for describing an operation of the GM cryocooler according to the embodiment.
Figure 8B:
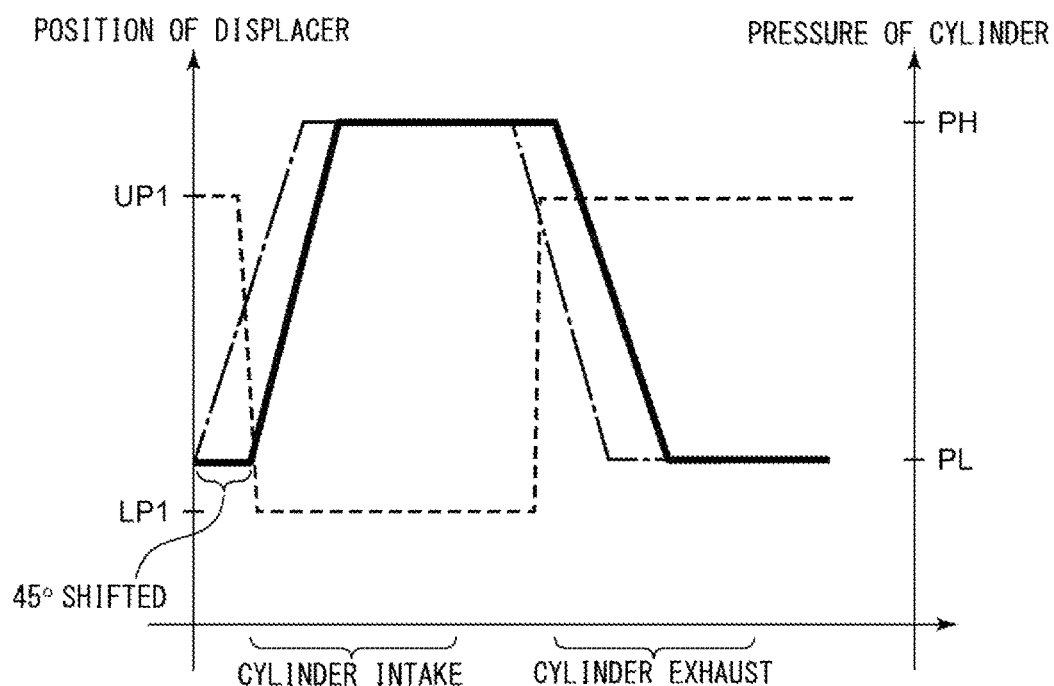
Figure 8C:
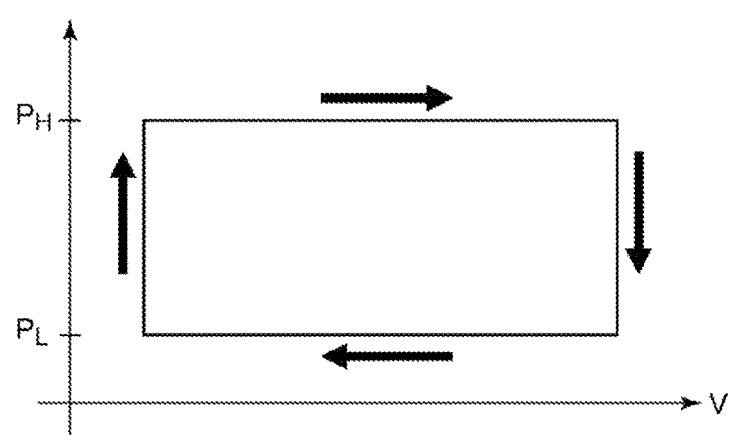
Figure 9A:
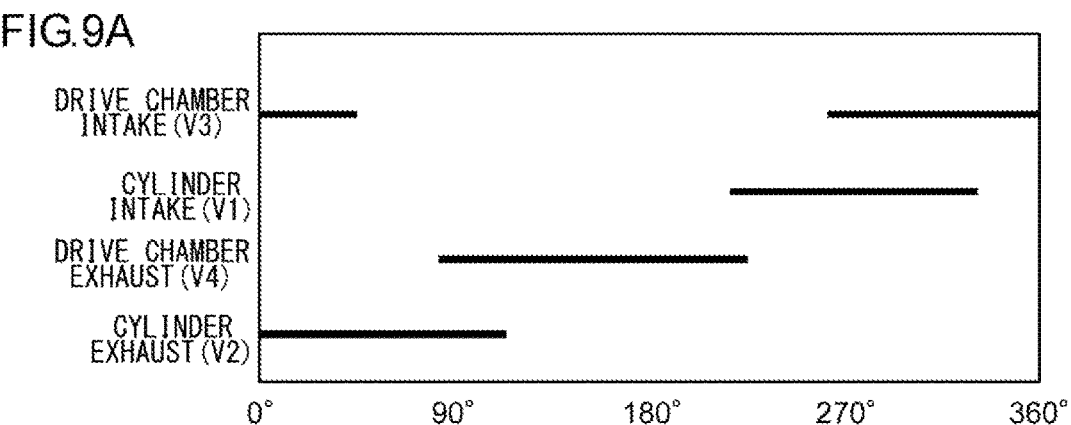
FIGS. 9A to 9C are views for describing an operation of the GM cryocooler according to the embodiment.
Figure 9B:
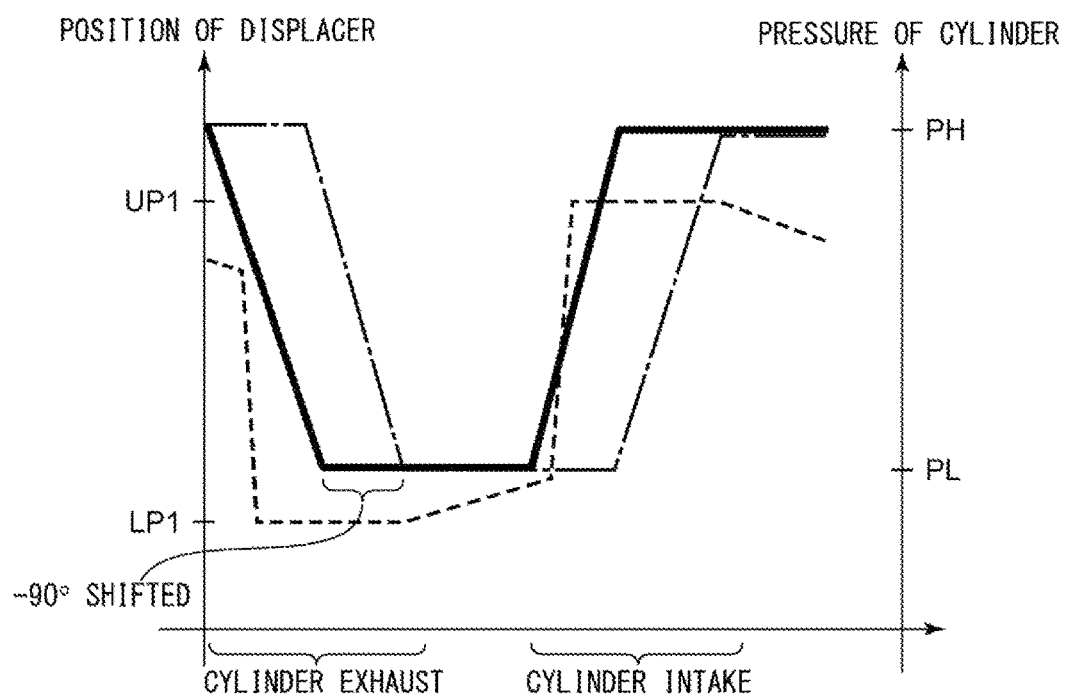
Figure 9C:
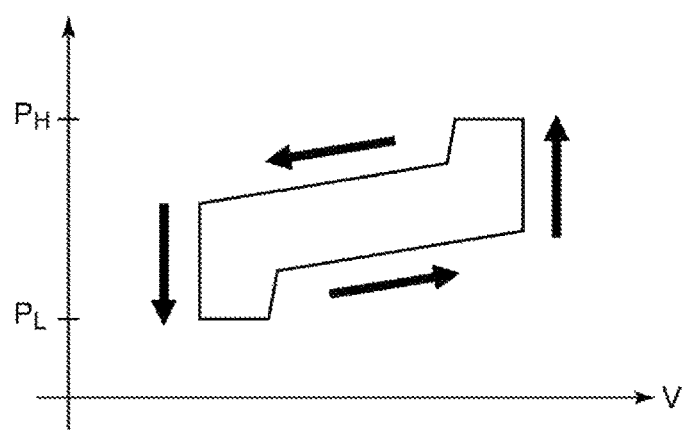

An operation of the GM cryocooler 10 according to the embodiment will be described with reference to FIGS. 8A to 9C. FIGS. 8A to 8C are views for describing the cooling valve timing of the GM cryocooler 10, and FIGS. 9A to 9C are views for describing the heating valve timing of the GM cryocooler 10.

FIG. 8A illustrates a timing chart of the GM cryocooler 10, and this illustrates an example of the cooling valve timing. FIG. 8A illustrates a valve open/closed state of the GM cryocooler 10 in time series per one cycle. One cycle is associated with 360°. When the valve rotor 152 illustrated in FIG. 3B is rotated in the forward rotation direction 72 with respect to the valve stator 150, the rotary valve 54 can realize the cooling valve timing illustrated in FIG. 8A. As illustrated, the rotary valve 54 is open and closed in the order of the auxiliary intake on-off valve V3, the main intake on-off valve V1, the auxiliary exhaust on-off valve V4, and the main exhaust on-off valve V2. A phase difference (for example, 45°) between a phase for opening the auxiliary intake on-off valve V3 and a phase for opening the main intake on-off valve V1 is determined, based on the first relative angle between the first valve rotor 152a and the second valve rotor 152b.

FIG. 8B illustrates an operation waveform per one cycle of the GM cryocooler 10 which is obtained when the GM cryocooler 10 is operated in accordance with the cooling valve timing illustrated in FIG. 8A. A solid line represents a pressure waveform of the displacer cylinder 26, a dashed line represents a pressure waveform of the drive chamber 46, and a dotted line represents a position waveform of the displacer 20.

The pressure waveform of the displacer cylinder 26 is 45° behind the pressure waveform of the drive chamber 46. As a result, a differential pressure is generated between the working gas chamber (that is, the expansion chamber 34 and the room temperature chamber 36) of the displacer cylinder 26 and the drive chamber 46, thereby enabling the displacer 20 to be moved. As illustrated, when the displacer 20 is located at the bottom dead center LP1, an inspiratory process is performed in the displacer cylinder 26. When the displacer 20 is located at the top dead center UP1, an exhaust process is performed in the displacer cylinder 26. That is, when the expansion chamber 34 has the maximum volume, the high pressure (PH) working gas is expanded and decompressed. Therefore, similarly to a normal refrigeration cycle, the GM cryocooler 10 can generate cold.

FIG. 8C is a PV diagram obtained when the GM cryocooler 10 is operated in accordance with the cooling valve timing illustrated in FIG. 8A. The PV diagram illustrates a figure closed clockwise. Accordingly, the working gas absorbs heat from the outside. Based on this diagram, it can be understood that the GM cryocooler 10 generates the cold when the GM cryocooler 10 is operated in accordance with the cooling valve timing.

FIG. 9A illustrates a timing chart of the GM cryocooler 10, and this illustrates an example of the heating valve timing. When the valve rotor 152 illustrated in FIG. 3C is rotated in the rearward rotation direction 80 with respect to the valve stator 150, the rotary valve 54 can realize the heating valve timing illustrated in FIG. 9A. The rotary valve 54 is rotated rearward by the reversible motor 56. Accordingly, as illustrated, the rotary valve 54 is open and closed in the order of the main exhaust on-off valve V2, the auxiliary exhaust on-off valve V4, the main intake on-off valve V1, and the auxiliary intake on-off valve V3. The heating valve timing in FIG. 9A is a valve opening and closing sequence reverse to the cooling valve timing in FIG. 8B. A phase difference between a phase for opening auxiliary intake on-off valve V3 and a phase for opening the main intake on-off valve V1 is determined, based on the second relative angle between the first valve rotor 152a and the second valve rotor 152b.

FIG. 9B illustrates an operation waveform per one cycle of the GM cryocooler 10 which is obtained when the GM cryocooler 10 is operated in accordance with the heating valve timing illustrated in FIG. 9A. Similarly to FIG. 8B, a solid line represents a pressure waveform of the displacer cylinder 26, a dashed line represents a pressure waveform of the drive chamber 46, and a dotted line represents a position waveform of the displacer 20.

The pressure waveform of the displacer cylinder 26 is 90° ahead of the pressure waveform of the drive chamber 46. As a result, a differential pressure is generated between the working gas chamber (that is, the expansion chamber 34 and the room temperature chamber 36) of the displacer cylinder 26 and the drive chamber 46, thereby enabling the displacer 20 to be moved. As illustrated, when the displacer 20 is located at or in the vicinity of the bottom dead center LP1, an exhaust process is performed in the displacer cylinder 26. When the displacer 20 is located at or in the vicinity of the top dead center UP1, an inspiratory process is performed in the displacer cylinder 26. That is, when the expansion chamber 34 has the maximum volume, the high pressure (PH) working gas is introduced and decompressed. Therefore, the GM cryocooler 10 can generate the heat.

FIG. 9C is a PV diagram obtained when the GM cryocooler 10 is operated in accordance with the heating valve timing illustrated in FIG. 9A. The PV diagram illustrates a figure closed counterclockwise. Accordingly, the working gas generates the heat to the outside. Based on this diagram, it can be understood that the GM cryocooler 10 generates the heat when the GM cryocooler 10 is operated in accordance with the heating valve timing.

In this way, according to the GM cryocooler 10 of the embodiment, when the rotary valve 54 is rotated forward by the reversible motor 56, the refrigeration cycle is formed in the GM cryocooler 10, and the GM cryocooler 10 is cooled. Then, when the rotation direction of the reversible motor 56 is switched from the forward rotation to the rearward rotation, the relative angle between the first valve rotor 152*a* and the second valve rotor 152*b* is switched from the first relative angle to the second relative angle. When the rotary valve 54 is rotated rearward by the reversible motor 56, the heating cycle is formed in the GM cryocooler 10, and the GM cryocooler 10 can be heated, based on the compression heat of the working gas.

According to the GM cryocooler 10 of the embodiment, similarly to the rearward rotation heating of the motor-driven type GM cryocooler, the gas-driven type GM cryocooler can be first heated, based on the compression heat of the working gas. The compression heat of the working gas is used. Accordingly, compared to natural heating, the GM cryocooler 10 can be efficiently heated within a short time. In addition, the GM cryocooler 10 can be heated to a temperature higher than the room temperature without adding a heating element such as an electric heater.

Hitherto, the present invention has been described, based on the embodiment. The present invention is not limited to the above-described embodiment, and various design changes can be made. It will be understood by those skilled in the art that various modification examples can be made, and the modification examples also fall within the scope of the present invention.

In the above-described embodiment, the inner cylinder portions (the first valve stator 150*a* and the first valve rotor 152*a*) of the rotary valve 54 configure the main pressure switching valve 60, and the outer cylinder portions (the second valve stator 150*b* and the second valve rotor 152*b*) of the rotary valve 54 configure the auxiliary pressure switching valve 62. However, the inner cylinder portions of the rotary valve 54 can configure the auxiliary pressure switching valve 62, and the outer cylinder portions of the rotary valve 54 can configure the main pressure switching valve 60. In addition, the internal flow path configuration of the rotary valve 54 is not limited to the above-described configuration, and various specific configurations can be adopted.

Figure 10:
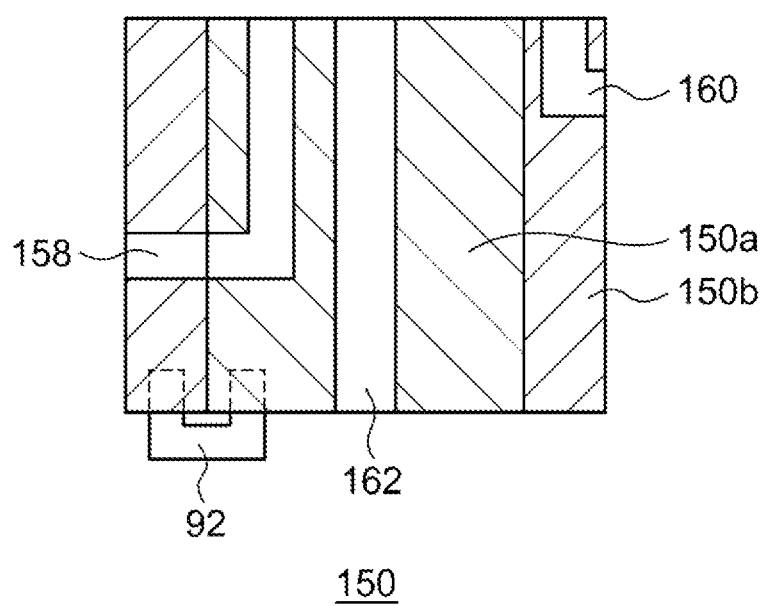
FIG. 10 is a schematic sectional view illustrating a valve stator according to another embodiment.

In the above-described embodiment, the valve rotor 152 is divided into two components, and the relative positions between the two components can be switched. However, the present invention is not limited thereto. FIG. 10 is a schematic sectional view illustrating the valve stator according to another embodiment. In a certain embodiment, the valve stator 150 may be divided into two components, and the relative positions between the two components may be switchable. In this case, the valve rotor 152 may be a single component in which the first valve rotor 152*a* and the second valve rotor 152*b* are integrated with each other. The rotary valve 54 may include a valve stator coupling mechanism 92 which couples the first valve stator 150*a* and the second valve stator 150*b* with each other so that the first valve stator 150*a* holds the first relative angle with the second valve stator 150*b* when the reversible motor 56 is rotated forward, and so that the first valve stator 150*a* holds the second relative angle with the second valve stator 150*b* when the reversible motor 56 is rotated rearward (refer to FIG. 10).

The valve stator coupling mechanism 92 may be configured to couple the first valve stator 150*a* with the second valve stator 150*b* by using a fastener such as a bolt, and may be configured to be switchable between the first relative angle and the second relative angle. For example, the valve stator coupling mechanism 92 may be manually detachable from the valve stator 150, and may be attachable to the valve stator 150 again after the relative angles are switched therebetween.

In the above-described embodiment, the valve rotor 152 is divided into two components, and the relative angles around the rotation axis 156 can be switched as the relative positions between the two components. However, the present invention is not limited thereto. If applicable, the rotary valve 54 may be configured to switch between the cooling valve timing and the heating valve timing by relatively moving in the rotation axis direction of the first valve rotor 152*a* and the second valve rotor 152*b*. In addition, the rotary valve 54 may be configured to switch between the cooling valve timing and the heating valve timing by relatively moving in the rotation axis direction of the first valve stator 150*a* and the second valve stator 150*b*.

FIGS. 11A and 11B are schematic sectional views illustrating the rotary valve 54 according to still another embodiment. For the convenience of description, the internal flow path of the rotary valve 54 is omitted in FIGS. 11A and 11B.

In the illustrated rotary valve 54, in a case where a first resin valve member is surrounded by a first metal valve member, the first resin valve member protrudes in the axial direction with respect to the first metal valve member. In this manner, the rotational sliding surface of the first resin valve member is located at an axial height which is different from that of the rotational sliding surface of the first metal valve member. In addition, in a case where a second metal valve member is surrounded by a second resin valve member, the second resin valve member protrudes in the axial direction with respect to the second metal valve member. In this manner, the rotational sliding surface of the second resin valve member is located at an axial height which is different from that of the rotational sliding surface of the second metal valve member.

The second metal valve member is located to rotationally slide with the first resin valve member. The diameter (for example, the outer diameter) of the first resin valve member is smaller than the diameter (for example, the outer diameter) of the second metal valve member. In addition, the first metal valve member is located to rotationally slide with the second resin valve member. The diameter (for example, the outer diameter) of the second resin valve member is smaller than the diameter (for example, the outer diameter) of the second metal valve member.

As a result, a portion including the rotational sliding surface in the first resin valve member enters a recess portion surrounded by the second resin valve member. The first resin valve member has a gap with the second resin valve member in the radial direction. The first metal valve member is located away from the second metal valve member in the axial direction.

The first resin valve member and/or the second resin valve member may be worn due to long-term use of the rotary valve 54. However, the first metal valve member is located away from the second metal valve member in the axial direction. Accordingly, even if the resin valve member is slightly worn, the first metal valve member and the second metal can be avoided from coming into contact with each other.

For example, in the rotary valve 54 illustrated in FIG. 11A, the first valve stator 150a is formed of a metal material, and the second valve stator 150b is formed of a resin material. The first valve rotor 152a is formed of a resin material, and the second valve rotor 152b is formed of a metal material. The second valve stator 150b protrudes in the axial direction with respect to the first valve stator 150a. Therefore, the axial height of the second stator flat surface 170b is higher than that of the first stator flat surface 170a (in the drawing, the second stator flat surface 170b is located above the first stator flat surface 170a). The first valve rotor 152a protrudes in the axial direction with respect to the second valve rotor 152b. Therefore, the axial height of the first rotor flat surface 172a is higher than that of the second rotor flat surface 172b (in the drawing, the first rotor flat surface 172a is located below the second rotor flat surface 172b).

The diameter of the first valve rotor 152a is smaller than the diameter of the first valve stator 150a. Therefore, the inner diameter of the second valve rotor 152b is smaller than the inner diameter of the second valve stator 150b. In addition, the outer diameter of the second valve stator 150b is smaller than the outer diameter of the second valve rotor 152b.

Therefore, an end portion including the first rotor flat surface 172a in the first valve rotor 152a enters a recess portion surrounded by the second valve stator 150b. The first valve rotor 152a has a gap 94 with the second valve stator 150b in the radial direction. The second valve rotor 152b is located away from the first valve stator 150a in the axial direction. The axial height of the gap 94 corresponds to the axial distance from the first valve stator 150a to the second valve rotor 152b.

In the rotary valve 54 illustrated in FIG. 11B, the second valve stator 150b is formed of the metal material, and the first valve stator 150a is formed of the resin material. The second valve rotor 152b is formed of the resin material, and the first valve rotor 152a is formed of the metal material. The first valve stator 150a protrudes in the axial direction with respect to the second valve stator 150b. Therefore, the axial height of the first stator flat surface 170a is higher than that of the second stator flat surface 170b. The second valve rotor 152b protrudes in the axial direction with respect to the first valve rotor 152a. Therefore, the axial height of the second rotor flat surface 172b is higher than that of the first rotor flat surface 172a.

The diameter of the first valve stator 150a is smaller than the diameter of the first valve rotor 152a. Therefore, the inner diameter of the second valve stator 150b is smaller than the inner diameter of the second valve rotor 152b. In addition, the outer diameter of the second valve rotor 152b is smaller than the outer diameter of the second valve stator 150b.

Therefore, an end portion including the first stator flat surface 170a in the first valve stator 150a enters a recess portion surrounded by the second valve rotor 152b. The first valve stator 150a has a gap 94 with the second valve rotor 152b in the radial direction. The first valve rotor 152a is located away from the second valve stator 150b in the axial direction. The axial height of the gap 94 corresponds to the axial distance from the second valve stator 150b to the first valve rotor 152a.

In a certain embodiment, the rotary valve may include a first valve element serving as one of the valve rotor rotatable around the rotary valve rotation axis and the valve stator, and a second valve element serving as the other of the valve rotor and the valve stator. The first valve element may include a first component configured to alternately connect the displacer cylinder to the compressor discharge port and the compressor suction port by being rotated relative to the second valve element, and a second component configured to alternately connect the drive chamber to the compressor discharge port and the compressor suction port by being rotated relative to the second valve element. The rotary valve may include a coupling mechanism that couples the first component and the second component with each other so that the first component holds a first relative angle with the second component around the rotary valve rotation axis when the reversible motor is rotated forward, and so that the first component holds a second relative angle around the second component and the rotary valve rotation axis when the reversible motor is rotated rearward. The first relative angle may be designed to cool the cryocooler, and the second relative angle may be designed to heat the cryocooler. The coupling mechanism may be configured to switch between the first relative angle and the second relative angle in response to a reverse in rotation direction of the reversible motor.

The first valve element may be the valve rotor, the second valve element may be the valve stator, and the first component and the second component may be respectively the first valve rotor and the second valve rotor. Alternatively, the first valve element may be the valve stator, the second valve element may be the valve rotor, and the first component and the second component may be respectively the first valve stator and the second valve stator.

The above-described embodiments have been described with reference to the gas-driven type GM cryocooler as an example. However, the present invention is not limited thereto. The rotary valve unit according to the embodiments may be applicable to the other cryocoolers in which the displacer is driven using the gas pressure. In addition, without being limited to a single stage cryocooler, the rotary valve unit according to the embodiments is applicable to a multi-stage cryocooler having two or more stages.

The present invention can be used in a field of the cryocooler and the rotary valve unit for the cryocooler.

It should be understood that the invention is not limited to the above-described embodiment, but may be modified into various forms on the basis of the spirit of the invention. Additionally, the modifications are included in the scope of the invention.

What is claimed is:
1. A cryocooler comprising:
a displacer capable of reciprocating in an axial direction;
a cylinder that accommodates the displacer;

a drive piston that drives the displacer in the axial direction;
a drive chamber that accommodates the drive piston;
a rotary valve that includes:
  a valve rotor which is rotatable around a rotary valve rotation axis, and
  a valve stator,
  wherein the valve rotor includes a first valve rotor configured to alternately connect the cylinder to a compressor discharge port and a compressor suction port by being rotated relative to the valve stator, and a second valve rotor configured to alternately connect the drive chamber to the compressor discharge port and the compressor suction port by being rotated relative to the valve stator; and
a reversible motor that is coupled with the rotary valve so as to rotate the first valve rotor and the second valve rotor relative to the valve stator around the rotary valve rotation axis,
wherein the rotary valve includes a coupling mechanism that couples the first valve rotor and the second valve rotor with each other so that both the valve rotors are rotated around the rotary valve rotation axis while the first valve rotor holds the first relative angle with the second valve rotor when the reversible motor is rotated forward, and so that both the valve rotors are rotated around the rotary valve rotation axis while the first valve rotor holds the second relative angle with the second valve rotor when the reversible motor is rotated rearward,
wherein the first relative angle is designed to cool the cryocooler, and the second relative angle is designed to heat the cryocooler,
wherein the coupling mechanism is configured to switch between the first relative angle and the second relative angle in response to a reverse in a rotation direction of the reversible motor,
wherein the coupling mechanism includes:
  an arc-shaped coupling pin guide groove formed around the rotary valve rotation axis, in one of the first valve rotor and the second valve rotor, and
  a coupling pin fixedly supported by the other of the first valve rotor and the second valve rotor, engaging with a first groove end portion of the coupling pin guide groove so that the first valve rotor holds the first relative angle with the second valve rotor when the reversible motor is rotated forward, and engaging with a second groove end portion of the coupling pin guide groove so that the first valve rotor holds the second relative angle with the second valve rotor when the reversible motor is rotated rearward, and
wherein the coupling pin guide groove is formed to guide the coupling pin from the first groove end portion to the second groove end portion when the reversible motor is switched from forward rotation to rearward rotation, and to guide the coupling pin from the second groove end portion to the first groove end portion when the reversible motor is switched from rearward rotation to forward rotation.

2. The cryocooler according to claim 1,
wherein the second relative angle is shifted from the first relative angle as much as an angle selected from a range of 30° to 60°.

3. A cryocooler comprising:
a displacer capable of reciprocating in an axial direction;
a cylinder that accommodates the displacer;
a drive piston that drives the displacer in the axial direction;
a drive chamber that accommodates the drive piston;
a rotary valve that includes:
  a valve rotor which is rotatable around a rotary valve rotation axis, and
  a valve stator,
  wherein the valve rotor includes a first valve rotor configured to alternately connect the cylinder to a compressor discharge port and a compressor suction port by being rotated relative to the valve stator, and a second valve rotor configured to alternately connect the drive chamber to the compressor discharge port and the compressor suction port by being rotated relative to the valve stator; and
a reversible motor that is coupled with the rotary valve so as to rotate the first valve rotor and the second valve rotor relative to the valve stator around the rotary valve rotation axis,
wherein the rotary valve includes a coupling mechanism that couples the first valve rotor and the second valve rotor with each other so that both the valve rotors are rotated around the rotary valve rotation axis while the first valve rotor holds the first relative angle with the second valve rotor when the reversible motor is rotated forward, and so that both the valve rotors are rotated around the rotary valve rotation axis while the first valve rotor holds the second relative angle with the second valve rotor when the reversible motor is rotated rearward,
wherein the first relative angle is designed to cool the cryocooler, and the second relative angle is designed to heat the cryocooler,
wherein the coupling mechanism is configured to switch between the first relative angle and the second relative angle in response to a reverse in a rotation direction of the reversible motor,
wherein the first valve rotor has a first cylindrical surface, the second valve rotor has a second cylindrical surface, and the first cylindrical surface and the second cylindrical surface are in contact with each other, and
wherein the rotary valve is configured so that an inlet/outlet of a working gas flow path does not exist on either the first cylindrical surface or the second cylindrical surface.

4. The cryocooler according to claim 3,
wherein the second relative angle is shifted from the first relative angle as much as an angle selected from a range of 30° to 60°.

5. A cryocooler comprising:
a displacer capable of reciprocating in an axial direction;
a cylinder that accommodates the displacer;
a drive piston that drives the displacer in the axial direction;
a drive chamber that accommodates the drive piston;
a rotary valve includes:
  a valve rotor which is rotatable around a rotary valve rotation axis, and
  a valve stator,
  wherein the valve rotor includes a first valve rotor configured to alternately connect the cylinder to a compressor discharge port and a compressor suction port by being rotated relative to the valve stator, and a second valve rotor configured to alternately connect the drive chamber to the compressor discharge port and the compressor suction port by being rotated relative to the valve stator; and a reversible motor that is coupled with the rotary valve so as to rotate the first valve rotor and the second valve rotor relative to the valve stator around the rotary valve rotation axis, wherein the rotary valve includes a coupling mechanism that couples the first valve rotor and the second valve rotor with each other so that both the valve rotors are rotated around the rotary valve rotation axis while the first valve rotor holds the first relative angle with the second valve rotor when the reversible motor is rotated forward, and so that both the valve rotors are rotated around the rotary valve rotation axis while the first valve rotor holds the second relative angle with the second valve rotor when the reversible motor is rotated rearward, wherein the first relative angle is designed to cool the cryocooler, and the second relative angle is designed to heat the cryocooler, wherein the coupling mechanism is configured to switch between the first relative angle and the second relative angle in response to a reverse in a rotation direction of the reversible motor, wherein the valve stator includes a first valve stator having a first stator flat surface formed of a resin material, and a second valve stator having a second stator flat surface formed of a metal material, and wherein the first valve rotor has a first rotor flat surface formed of a metal material and coming into surface contact with the first stator flat surface, and the second valve rotor has a second rotor flat surface formed of a resin material and coming into surface contact with the second stator flat surface, or wherein the valve stator includes a first valve stator having a first stator flat surface formed of a metal material, and a second valve stator having a second stator flat surface formed of a resin material, and wherein the first valve rotor has the first rotor flat surface formed of a resin material and coming into surface contact with the first stator flat surface, and the second valve rotor has the second rotor flat surface formed of a metal material and coming into surface contact with the second stator flat surface.

6. The cryocooler according to claim 5,
wherein the second relative angle is shifted from the first relative angle as much as an angle selected from a range of 30° to 60°.

* * * * *